(12) United States Patent
Pafumi et al.

(10) Patent No.: US 8,949,828 B2
(45) Date of Patent: Feb. 3, 2015

(54) SINGLE POINT, SCALABLE DATA SYNCHRONIZATION FOR MANAGEMENT OF A VIRTUAL INPUT/OUTPUT SERVER CLUSTER

(75) Inventors: James A. Pafumi, Leander, TX (US); Jacob Jason Rosales, Austin, TX (US); Morgan Jeffrey Rosas, Cedar Park, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 852 days.

(21) Appl. No.: 13/004,139

(22) Filed: Jan. 11, 2011

(65) Prior Publication Data

US 2012/0180070 A1   Jul. 12, 2012

(51) Int. Cl.
G06F 9/455 (2006.01)
G06F 9/54 (2006.01)
H04L 29/06 (2006.01)

(52) U.S. Cl.
CPC ............... *G06F 9/542* (2013.01); *H04L 69/162* (2013.01)
USPC .......................................................... 718/1

(58) Field of Classification Search
CPC ............ H04L 29/0602; H04L 65/1073; H04L 67/327; H04L 69/162; G06Q 10/107; G06F 9/542; G06F 9/5077; G06F 11/1658
USPC .......................................................... 718/1
See application file for complete search history.

(56) References Cited

U.S. PATENT DOCUMENTS

| | | | |
|---|---|---|---|
| 5,999,712 A | 12/1999 | Moiin et al. | |
| 7,392,421 B1 | 6/2008 | Bloomstein | |
| 7,457,722 B1 | 11/2008 | Shain | |
| 7,840,833 B2 | 11/2010 | Tripathi et al. | |
| 8,392,378 B2 | 3/2013 | Pafumi et al. | |
| 8,458,413 B2 | 6/2013 | Ganti et al. | |
| 8,473,692 B2 | 6/2013 | Rosales et al. | |
| 8,495,412 B2 | 7/2013 | Pafumi et al. | |
| 8,521,703 B2 | 8/2013 | Mewhinney et al. | |
| 8,533,164 B2 | 9/2013 | Pafumi et al. | |

(Continued)

OTHER PUBLICATIONS

U.S. Appl. No. 12/879,978 entitled "Autonomous Propagation of Virtual Input/Output (VIO) Operation(s) to Second VIO Server (VIOS) Due to a Detected Error Condition at a First VIOS"; Non-final office action dated Oct. 22, 2012 (20 pg).

(Continued)

*Primary Examiner* — Mohammed Rehman
*Assistant Examiner* — Xuxing Chen
(74) *Attorney, Agent, or Firm* — Yudell Isidore PLLC; Matthew Baca

(57) ABSTRACT

A method, data processing system and computer program product provide scalable data synchronization for a virtual input/output server (VIOS) cluster and one or more registered callers. A first VIOS is commits as a primary node of the VIOS cluster and performs the functions of: registering one or more callers to receive notification from the first VIOS of specific events occurring within the cluster; receiving notification of an occurrence of one of the specific events; and in response to receiving notification of the specific events, a deamon of the first VIOS retrieving a message payload file from a message payload file directory within the shared VIOS DB and passing the message payload file to the API, which forwards/posts the relevant event notification information from the message payload file to the TCP socket of each registered caller.

30 Claims, 12 Drawing Sheets

(56) References Cited

U.S. PATENT DOCUMENTS

| | | |
|---|---|---|
| 8,560,628 B2 | 10/2013 | Ganti et al. |
| 2004/0162061 A1* | 8/2004 | Abrol et al. ............... 455/414.1 |
| 2009/0240780 A1* | 9/2009 | Brown et al. ............... 709/206 |
| 2012/0110274 A1* | 5/2012 | Rosales et al. ............... 711/153 |
| 2012/0150985 A1 | 6/2012 | Marion et al. |
| 2012/0151265 A1 | 6/2012 | Bender et al. |
| 2012/0179798 A1 | 7/2012 | Pafumi et al. |
| 2012/0179837 A1 | 7/2012 | Bender et al. |
| 2012/0180070 A1 | 7/2012 | Pafumi et al. |
| 2012/0246517 A1 | 9/2012 | Bender et al. |
| 2013/0013569 A1 | 1/2013 | Pafumi et al. |
| 2013/0031341 A1 | 1/2013 | Ganti et al. |
| 2013/0254165 A1 | 9/2013 | Pafumi et al. |

OTHER PUBLICATIONS

U.S. Appl. 12/879,978 entitled "Autonomous Propagation of Virtual Input/Output (VIO) Operation(s) to Second VIO Server (VIOS) Due to a Detected Error Condition at a First VIOS"; Notice of Allowance dated Mar. 25, 2013 (18 pg).

* cited by examiner

SINGLE POINT, SCALABLE DATA SYNCHRONIZATION FOR MANAGEMENT OF A VIRTUAL INPUT/OUTPUT SERVER CLUSTER

BACKGROUND

1. Technical Field

The present invention relates in general to distributed data processing systems and in particular to distributed data processing systems with cluster-aware virtual input/output servers (VIOSes). Still more particularly, the present invention relates to a method, data processing system and computer program product that enable election of primary nodes within a VIOS cluster.

2. Description of the Related Art

Each Virtual Input/Output Server (VIOS) can provide I/O resources to hundreds of virtual machines. In one configuration, thousands of virtual storage block devices can be exported to hundreds of virtual machines. With such configurations, management of all of these devices becomes very difficult. Management tools have been proposed to attempt to improve manageability for these virtual devices. One such tool stores object data into the tool's local data store (db2 database). This database is populated by first discovering the endpoints on the VIOS and then querying for resources. However, with this tool, once the discovery is complete, the tool continuously polls all VIOS partitions in the tool's domain to keep the data within the tool's local data store in a current state. Use of this tool provides a solution that is not scalable and makes the tool unusable in a cluster environment.

BRIEF SUMMARY

Disclosed are a method, data processing system, and a computer program product that provide scalable data synchronization for a virtual input/output server (VIOS) cluster and one or more registered callers. The method is performed by a first VIOS within the VIOS cluster that is elected as a primary node. The method comprises: committing the first VIOS as a primary node of the VIOS cluster; registering one or more callers to receive notification from the first VIOS of specific events occurring within the cluster; receiving notification of an occurrence of one of the specific events; and in response to receiving notification of the occurrence of one of the specific events, automatically forwarding information of the specific event to each of the one or more registered callers.

In one embodiment, registering the one or more callers to receive notification comprises registering a transmission control protocol (TCP) socket of each caller with an application programming interface (API) of the first VIOS. Also, the automatically forwarding of information of the specific event comprises: a daemon of the first VIOS passing a message payload file to the API. The message payload file is retrieved from a message payload file directory within the shared VIOS DB. The automatically forwarding also comprises: the API forwarding/posting the relevant event notification information from the message payload file to the TCP socket of each registered caller for that type of event occurrence.

In one embodiment, receiving notification of an occurrence of one of the specific events further comprises: receiving an event notification from a second node of the VIOS cluster; parsing the event notification for indentifying information; and accessing a message payload file directory within the shared VIOS DB and retrieving a message payload file corresponding to the indentifying information parsed from the event notification.

Further, committing the first VIOS as a primary node further comprises: notifying each other node within the VIOS cluster that the first VIOS has committed as the primary node; in response to determining that the first VIOS no longer meets the requirements to be the primary node: initiating a primary node election; and withholding the forwarding of information to the registered callers of any received event notification; and in response to determining that the first VIOS is no longer the primary node, forwarding a request to a new primary node to issue a resynchronization command to allow the callers to register with a current primary node.

In yet another embodiment, the method comprises: detecting a node drop alert from within the VIOS cluster; determining which node has dropped from the VIOS cluster; checking a message payload file directory for a payload entry associated with the dropped node; responsive to finding a message payload file for the dropped node, determining whether the message payload file was completely written before the node dropped; in response to the file having been completed written before the node dropped, reading the message payload file and posting the LCE for each file to the one or more registered callers; and issuing a caller resynchronization command to the one or more callers registered to receive information about node drop events.

Additionally, in one embodiment, the one or more registered callers comprise a management tool and the one or more specific events are life cycle events (LCE), and the method further comprises: responsive to receiving a command line interface command from the management tool to execute a discovery operation, facilitating a discovery operation of the management tool by accessing the VIOS DB and discovering each node within the VIOS cluster; returning to the management tool via the API a listing of each node within the VIOS cluster; returning to the management tool one or more additional information about one or more of the VIOS cluster and one or more of the nodes within the VIOS cluster; and registering the management tool for receipt of notification of an occurrence of each LCE occurring on the nodes of the VIOS cluster.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The described embodiments are to be read in conjunction with the accompanying drawings, wherein.

DETAILED DESCRIPTION

Figure 1A:
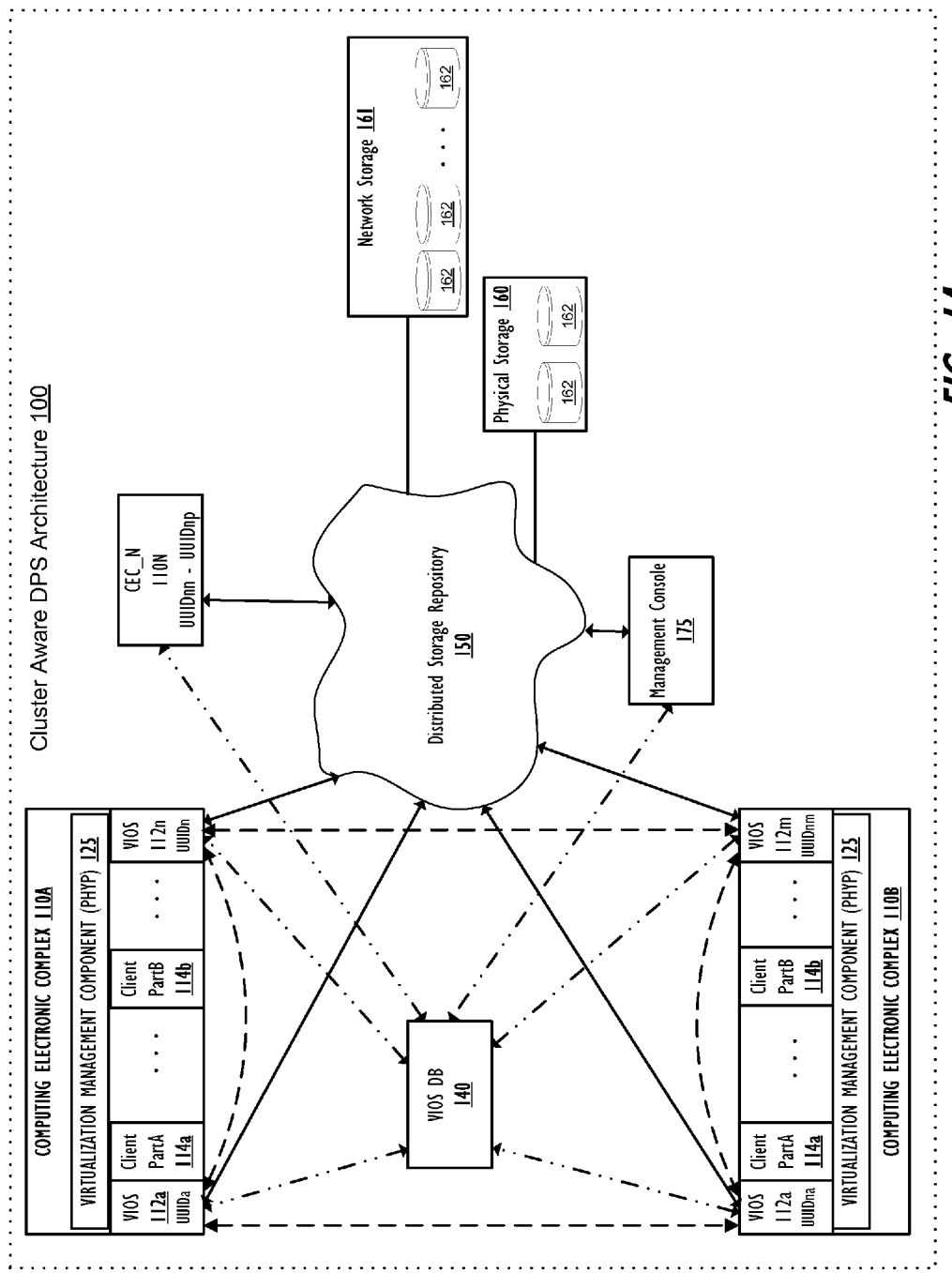
FIG. 1A illustrates a first view of a cluster (aware) data processing system within which various of the functional features of the described embodiments are implemented, according to one embodiment.

The illustrative embodiments provide a method, data processing system, and computer program product that provide scalable data synchronization for a virtual input/output server (VIOS) cluster and one or more registered callers. The method is performed by a first VIOS within the VIOS cluster that is elected as a primary node. The method comprises: committing the first VIOS as a primary node of the VIOS cluster; registering one or more callers to receive notification from the first VIOS of specific events occurring within the cluster; receiving notification of an occurrence of one of the specific events; and in response to receiving notification of the occurrence of one of the specific events, automatically forwarding information of the specific event to each of the one or more registered callers.

In one embodiment, registering the one or more callers to receive notification comprises registering a transmission control protocol (TCP) socket of each caller with an application programming interface (API) of the first VIOS. Also, the automatically forwarding of information of the specific event comprises: a daemon of the first VIOS passing a message payload file to the API. The message payload file is retrieved from a message payload file directory within the shared VIOS DB. The automatically forwarding also comprises: the API forwarding/posting the relevant event notification information from the message payload file to the TCP socket of each registered caller for that type of event occurrence.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the invention. The invention may thus be implemented with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the invention to embodiments in which different element, feature or concept names are utilized. Thus, each term utilized herein is to be given its broadest interpretation given the context in which that terms is utilized. For example, as utilized herein, the term cluster-aware refers to the operational state of each VIOS within the cluster where the VIOSes contain information about which other VIOSes are connected within the cluster, the configuration of the different CECs within the DPS supported by the cluster, information about which client LPARs are supported by each VIOS, and other state and operating information and data related to performing VIO operations using the physical I/O devices of the DPS and those of the distributed storage repository (storage repository). Cluster awareness is supported by both a shared, networked VIOS database and locally maintained copies of VIOS cluster data within each VIOS.

As further described below, implementation of the functional features of the invention is provided within processing devices/structures and involves use of a combination of hardware, firmware, as well as several software-level constructs (e.g., program code). The presented figures illustrate both hardware components and software components within example data processing architecture having a specific number of processing nodes (e.g., computing electronic complexes). The illustrative and described embodiments assume that the system architecture may be scaled to a much larger number of processing nodes.

In the following descriptions, headings or section labels are provided to separate functional descriptions of portions of the invention provided in specific sections. These headings are provided to enable better flow in the presentation of the illustrative embodiments, and are not meant to imply any limitation on the invention or with respect to any of the general functions described within a particular section. Material presented in any one section may be applicable to a next section and vice versa. The following sequence of headings and subheadings are presented within the specification:

A. General Architecture
B. Cluster-Aware VIOS
C. VIOS API Communication Infrastructure
D. VIOS Shared DB for Primary Node Election and LCE message notification
E. Autonomous Primary Node Election
F. Single Point, Scalable Data Synchronization for Cluster Management A. General Architecture With specific reference now to FIG. 1A, there is depicted a block diagram of an example cluster-aware (CA), distributed data processing system (DPS) architecture 100, within which the functional aspects of the described embodiments may advantageously be implemented. For simplicity, cluster-aware, distributed DPS architecture 100 shall be referred to herein simply as DPS 100. DPS 100 comprises a plurality of computing nodes, each referred to herein as a computing electronic complex (CEC), of which CECs 110A and 110B are illustrated. The number of CECs within DPS 100 may vary, ranging from a single CEC in a smaller system extending up to hundreds or thousands of CECs, in larger scaled systems. For simplicity, the embodiments shall be described from the perspective of a single CEC (CEC 110A) or two CECs (CECs 110A, 110B). Each CEC 110A-110B comprises at least one (and in most instances a plurality of) Virtual Input/Output Server 112 (also referred to herein as a VIO Server or VIOS), with functionality as described below. The actual number of VIOSes 112 within each CEC 110 of DPS 100 is a design feature and may vary. Also supported within each CEC 110A-110B are client logical partitions (interchangeably referred to as client LPARs or "clients"), of which a first two clients, clientA 114a and clientB 114b, are illustrated. As described below, with reference to FIG. 2, client LPARs 114 are logical partitions of a virtualized (or operating system partitioned) computing system. The actual number of clients within each CEC 110 may vary and could range from a single client to hundreds or thousands of clients, without limitation. For efficiency in presenting the inventive concepts herein, only two clients are presented within each CEC 110 of the various illustrative and described embodiments.

DPS 100 also comprises a distributed storage facility, accessible to each of the CECs 110 and the components within the CECs 110. Within the described embodiments, the distributed storage facility will be referred to as distributed storage repository 150, and the distributed storage repository 150 enables several of the client level functional features provided by the embodiments described herein. Distributed storage repository 150 provides a single view of storage that is utilized by each CEC 110 and for each client 114 of each CEC 110 within a cluster-aware, distributed system. Distributed storage repository 150 comprises local physical storage 160 and network storage 161, both of which comprise multiple physical storage units 162 (e.g., disks, solid state drives, etc.). The physical disks making up distributed storage repository 150 may be distributed across a storage network (e.g., a SAN). Additionally, distributed storage repository 150 provides a depository within which is stored and maintained the software utility, instruction code, OS images, client images, data (system, node, and client level), and/or other functional information utilized in maintaining the client-level, system management, and storage-level operations/features of DPS 100. In addition to distributed storage repository 150, DPS 100 also comprises a VIOS database (DB) 140, which may also be a distributed storage facility comprising physical disks across a storage network. VIOS DB (or DB) 140 is a repository that stores and provides access to various cluster configuration data and other functional components/modules and data structures that enable the various cluster-aware functionality described herein. In one embodiment, portions of distributed storage repository 150 may be allocated to provide storage pools for a cluster. Each VIOS 112 of the cluster maintains a local view of the DB 140 and updates the cluster level information/data/data structures within DB 140 as such information/data is created or updated.

Communication between each VIOS 112 of each CEC 110 as well as with the VIOSes of at least one other CEC 110 is generally supported via a plurality of inter-CEC interconnects, illustrated as bi-directional, dashed lines connecting pairs of VIOSes 112. The arrows indicated two way data exchange or communication between components. In addition to the inter-CEC interconnects, each VIOS 112 is also connected to distributed storage repository 150 via VIOS-to-Store or CEC-to-Store interconnects, which are also illustrated as full lined bi-directional arrows. Also, each VIOS 112 is connected to DB 140 via VIOS-to-DB interconnects, presented as dashed and dotted lines. With the exception of the inter-CEC connectors running from a first VIOS (e.g., VIOS 112a) of a first CEC to a second VIOS (e.g., VIOS 112b) on the same CEC, the various interconnects represent a network level connectivity between the VIOS nodes of the cluster and the DB 140 and the distributed storage repository 150. As utilized herein, references to one or more "nodes" are assumed to refer specifically to a VIOS within the cluster. DPS 100 also comprises a management console 175 on which a management tool (not shown) executes.

Figure 1B:
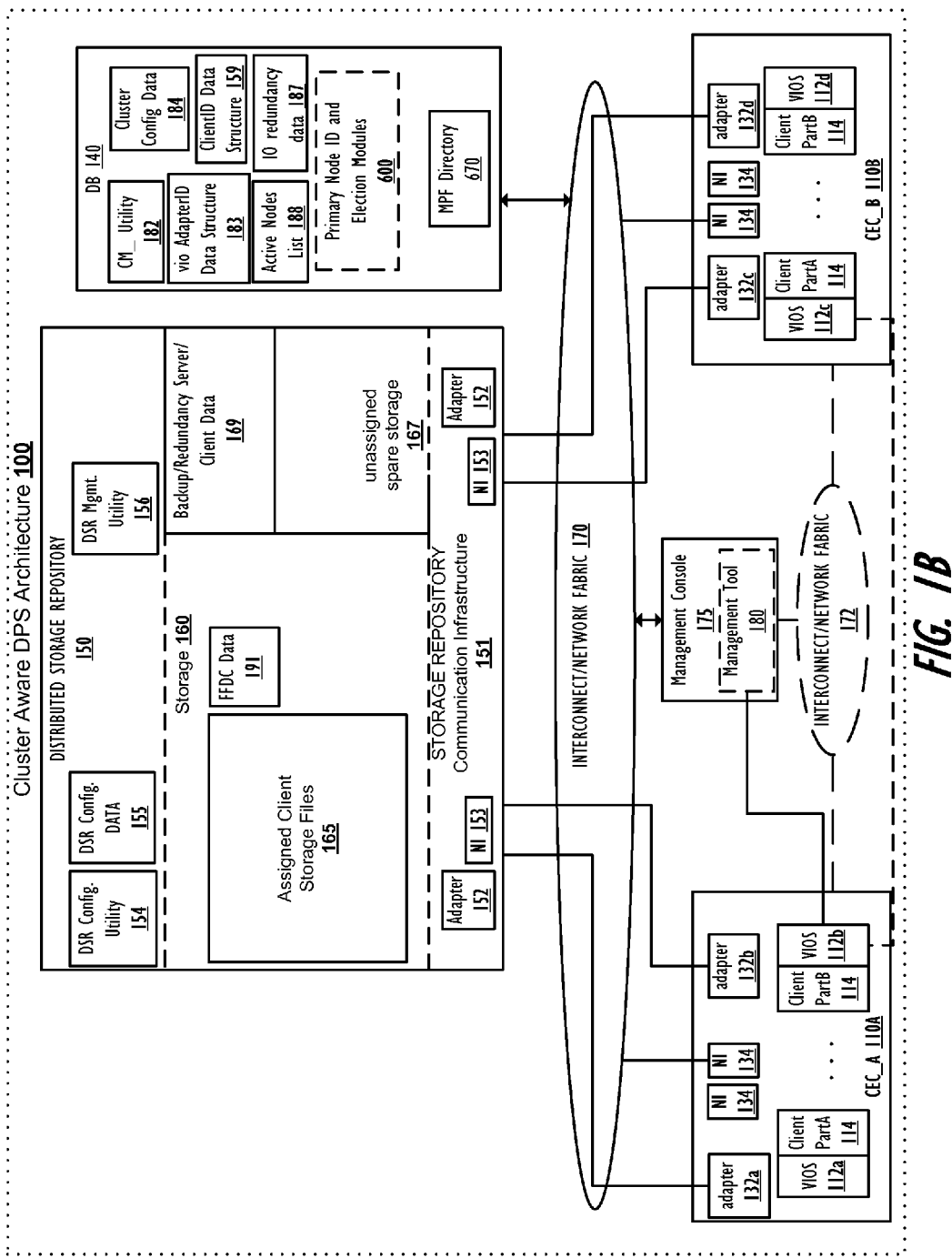
FIG. 1B illustrates a second view of the cluster data processing system (DPS) of FIG. 1A depicting additional functional components within the computing complexes and shared storage, according to one embodiment.

Turning now to FIG. 1B, there is illustrated another view of DPS 100 illustrating the network-based connection of the CECs 110 to the distributed storage repository 150 and DB 140. FIG. 1B illustrates in greater detail the network connectivity of VIOSes and CECs to each other and to Distributed storage repository 150. With this view, CEC_A (Node_A) 110A and CEC_B (Node_B) 110B comprise similar constructs as presented in FIG. 1A. Each CEC 110 within DPS 100 connects to distributed storage repository 150 via one or more networks and/or I/O interconnect/switch fabric (generally illustrated as interconnect/network fabric 170). The descriptions and illustrations assume that at least some of the CECs 110 of DPS 100 and distributed storage repository 150 are located remotely from each other, including being located in different countries, for example, such that no direct physical connectivity exists between the respective devices. For simplicity, the embodiments are described as having primary interconnect/network 170 comprising a private wide area network (WAN) or a public WAN (such as the Internet), although other network types (e.g., a local area network) are possible and supported.

As depicted, in one or more embodiments, each CEC 110 is also connected to one or more neighbor CECs 110, in order to provide efficient fail-over and/or mobility support and other functions, as described hereinafter. As utilized herein, the term neighbor refers to a connected second CEC with which a first CEC is able to communicate, and references to a neighbor CEC is not limited to a second CEC in geographic proximity to the first CEC. CEC_A 110A and CEC_B 110B are illustrated connected to each other via some connecting medium, which may include a different network (such as a local area network) 172 or some type of direct interconnect (e.g., a fiber channel connection) when physically close to each other. The connection between neighbor CECs 110A and 110B is illustrated as a direct line connection or a secondary network connection (172) between CECs 110A and 110B. However, it is appreciated that the connections are not necessarily direct, and may actually be routed through the same general interconnect/network 170 as with the other CEC connections to distributed storage repository 150. In one or more alternate embodiments, the connections between CECs may be via a different network (e.g., network 172, FIG. 1B), such as a local area network (LAN).

Also illustrated by FIG. 1B is an initial view of several of the functional and other components provided within an example distributed storage repository 150 and an initial listing of some components of VIOS DB 140. As depicted, each CEC 110 comprises one or more network interfaces 134 and one or more I/O adapters 132 to enable the CEC 110 and thus the other components (i.e., client partitions) of the CEC 110 to engage in network level communication, as described below. Specifically, each VIOS 112 emulates virtual client I/O adapters to enable communication by the client LPARs 114 with distributed storage repository 150 and/or other clients, within the same CEC or on a different CEC. The VIOSes 112 emulate virtual I/O adapters and communicates with distributed storage repository 150 by connecting with corresponding virtual sever I/O adapters at distributed storage repository 150. The VIOSes 112 within each CEC 110 are thus able to support client level access to distributed storage 150 and enable the exchange of system level and client level information with distributed storage repository 150.

In addition, each VIOS 112 also comprises the functional components/modules and data to enable the VIOSes 112 within DPS 100 to be aware of the other VIOSes anywhere within the cluster (DPS 100). From this perspective, the VIOSes 112 are referred to herein as cluster-aware, and their interconnected structure within DPS 100 thus enables DPS 100 to also be interchangeably referred to as cluster-aware DPS 100. As a part of being cluster-aware, each VIOS 112 also connects to VIOS DB 140 via network 170 and communicates cluster-level data with DB 140 to support the cluster management functions described herein.

To support the virtual I/O operations with the VIOSes 112 and the associated virtual client I/O adapters, distributed storage repository 150 comprises communication infrastructure 151. Communication infrastructure 151 comprises network interface(s) 153 and a plurality of server I/O adapters 152 utilized for cluster-level communication and enabling access to data/code/software utility stored on distributed storage repository 150 to complete I/O operations thereto. Specifically, these server I/O adapters are also presented as virtual sever I/O adapters, which are paired with virtual I/O adapters (132) that are assigned to clients 114 of CECs 110. As further shown with FIG. 1B, distributed storage repository (DSR) 150 also comprises a plurality of software, firmware and/or software utility components, including DSR configuration utility 154, DSR configuration data 155 (e.g., inodes for basic file system access, metadata, authentication and other processes), and DSR management utility 156.

Figure 6:
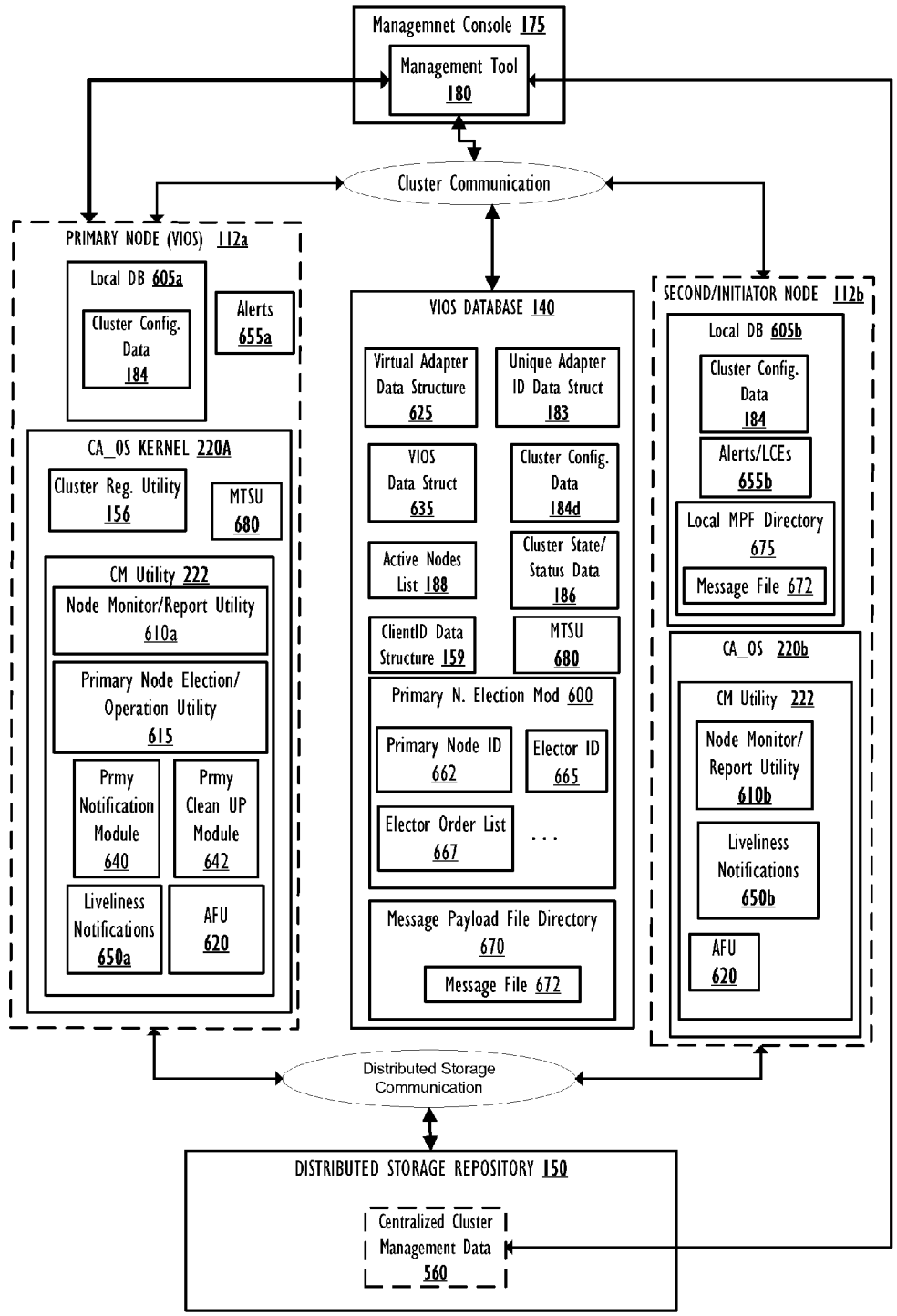
FIG. 6 is a block diagram representation of stored data structures and other functional components within a VIOS DB and a primary node and secondary node to perform autonomous primary node election processes, according to one embodiment.

To support the cluster awareness features of the DPS 100, and in accordance with the illustrative embodiment, distributed storage repository 150 also comprises VIOS database (DB) 140, in which is stored various data structures generated during set up and/or subsequent processing of the VIOS cluster-connected processing components (e.g., VIOSes and management tool). VIOS DB 140 comprises a plurality of software or firmware components and/or and data, data modules or data structures, several of which are presented in FIG. 1B, for illustration. Among these components are cluster management (CM) utility 182, VIO AdapterID data structure 183, cluster configuration data 184, Client identifying (ID) data structure 159, active nodes list 186, and I/O redundancy data 187, among others. Additionally, VIOS DB 140 comprises primary node ID and primary node election data modules 600, which are a plurality of different functional components and data that are utilized during an election of a primary node (VIOS) from among the various nodes in the VIOS cluster. Finally, VIOS DB 140 comprises message payload file (MPF) directory 670, which contains one or more message files received from one or more initiator nodes (VIOSes). The message files provide notification of the occurrence of a life cycle event (LCE) on or detected by the initiator node. Additional detail of components within VIOS DB 140 is provided with the description of FIG. 6 presented below. These various components support the various clustering functionality and cluster-aware I/O operations of the one or more VIOSes 112, as described herein. Additional features of VIOS DB 140 and distributed storage repository 150 as well as the specific components or sub-components that enable the various clustering functionality are presented within the description of the remaining figures and throughout the description of the various embodiments.

Figure 3:
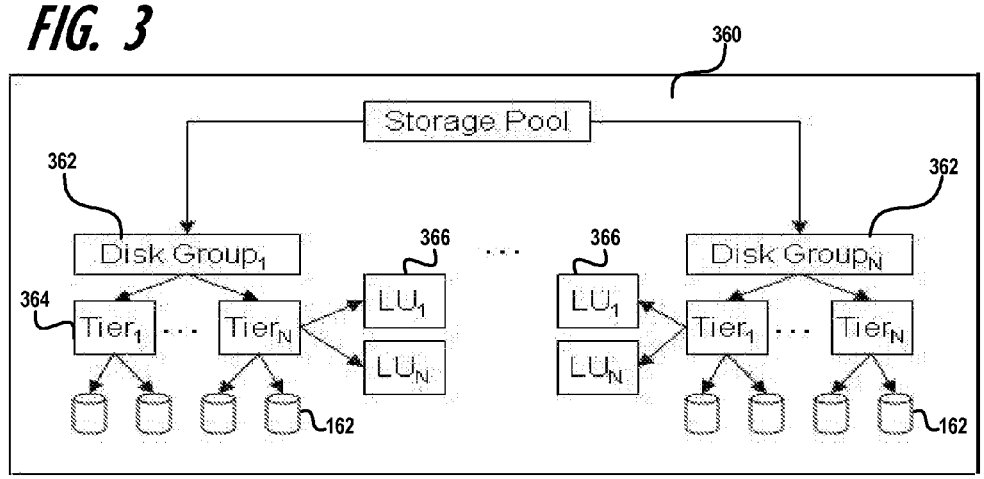
FIG. 3 illustrates an example shared storage pool of a distributed storage repository utilized for storage I/O functions of the VIOSes, according to one embodiment.

FIG. 3 illustrates an example configuration of a storage pool utilized to provide the I/O storage capability of distributed storage repository 150 within a cluster aware DPS 100. Specifically, FIG. 3 provides details on how these physical volumes are used within the storage pool. As shown, storage pool 360 within the cluster contains one or more Disk Groups 362. Disks Groups 362 provide administrators the ability to provide access policies to a given subset of physical volumes 162 within the storage pool 360. Once a disk group 362 has been defined, administrators can further categorize the subset into Storage Tiers 364 based on disk characteristics. Once a Disk Group 362 and Storage Tier 364 have been defined, administrators carve Logical Units (LU) 366 to be exported to client partitions (114).

In one embodiment, the initial set up of the storage pools, VIOS DB 140 and corresponding data structures is activated by execution of a cluster aware operating system by management tool 180. Once the infrastructure has been established, however, maintenance of the infrastructure, including expanding the number of nodes, where required, is performed by the VIOSes in communication with DB 140 and the management tool 180.

Also associated with DPS 100 of FIG. 1A-1B and communicatively coupled to distributed storage repository 150 and DB 140 and VIOSes 112 is management console 175, which may be utilized by an administrator of DPS 100 (or of distributed storage repository 150 or DB 140) to access DB 140 or distributed storage repository 150 and configure resources and functionality of DB 140 and of distributed storage repository 150 for access/usage by the VIOSes 112 and clients 114 of the connected CECs 110 within the cluster. As shown in FIG. 1B and described throughout the specification, management tool 180 is implemented within management console 175. However, it is appreciated that (resources of) any node within DPS 100 may be selected/elected to perform the functions of management tool 180, and the selected node would then perform one or more of the below described cluster creation and the other cluster monitoring and management functions, utilizing the availability of the resources provided by DB 140 and distributed storage repository 150.

In an alternate embodiment, management tool 180 is an executable module that is executed within a client partition at one of the CECs within DPS 100. In one embodiment, the management tool 180 controls some of the operations of the VIOS cluster and may enable each node within the cluster to maintain current/updated information regarding the cluster, including providing notification of any changes made to one or more of the nodes within the cluster.

Figure 2:
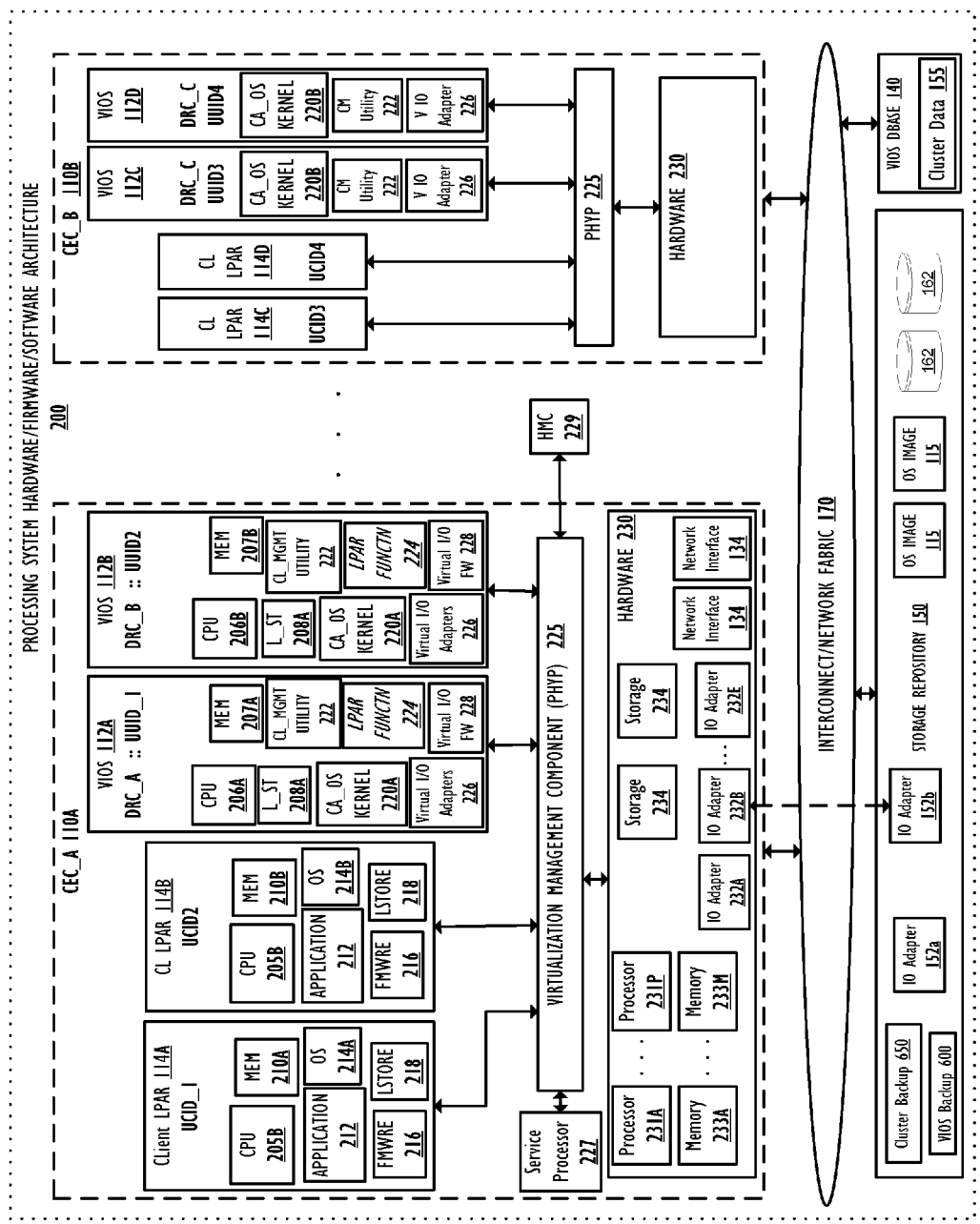
FIG. 2 illustrates an internal configuration of a computing electronic complex (CEC) within the cluster DPS having virtualized OS partitions, including virtual I/O server (VIOS) partitions, according to one embodiment.

With reference now to FIG. 2, there is presented a third view of an example DPS 100, emphasizing a processing system architecture 200 (i.e., architecture of the individual CECs, and specifically CEC_A 110A). CEC_A 110A (CEC 110A) serves as the example CEC that is described in greater detail in FIG. 2 and throughout the specification. CEC 110A is presented as a server that comprises hardware components and software/firmware/OS components that are logically partition to create a plurality of virtualized machine partitions, which are assigned as client logical partitions (LPARs) and virtual I/O servers (VIOSes). Hardware components 230 of example CEC 110A comprises one or more processors 231A-231P, one or more memories 233A-233M, and local storage 234. The processors 230A-230P are interconnected with one or a plurality of memories 233A-233M and with local storage 234 via a bus, interconnect/switch or an interconnect fabric (not specifically shown). The specific internal connectivity of components, which may be distributed across a large scale interconnect fabric, is not germane to the described embodiments, and no further detail is presented regarding the particular type of interconnectivity between the system hardware components.

Also included within hardware components 230 are one or more physical network interfaces 134 by which CEC_A 110A connects to an external network, such as network 170, among others. Additionally, hardware components 230 comprise a plurality of I/O adapters 232A-232E, which provides the I/O interface for CEC_A 110A. I/O adapters 232A-232E are physical adapters that enable CEC_A 110 to support I/O operations via an I/O interface with both locally connected and remotely (networked) connected I/O devices, including SF storage 150. Examples of I/O adapters include Peripheral Component Interface (PCI), PCI-X, or PCI Express Adapter, and Small Computer System Interconnect (SCSI) adapters, among others. CEC 110 is logically partitioned such that different I/O adapters 232 are virtualized and the virtual I/O adapters may then be uniquely assigned to different logical partitions.

Logically located above the hardware level (230) is a virtualization management component, provided as a Power Hypervisor (PHYP) 225 (trademark of IBM Corporation), as one embodiment. While illustrated and described throughout the various embodiments as PHYP 225, it is fully appreciated that other types of virtualization management components may be utilized and are equally applicable to the implementation of the various embodiments. PHYP 225 has an associated service processor 227 coupled thereto within CEC 110. Service processor 227 may be used to provide various services for one or more logical partitions. PHYP 225 is also coupled to hardware management controller (HMC) 229, which exists outside of the physical CEC 110. Operations of the different logical partitions may be controlled through HMC 229, which is a separate data processing system from which a system administrator may perform various functions, such as reallocation of resources to different logical partitions.

CEC_A 110A further comprises a plurality of user-level logical partitions (LPARs), of which a first two are shown, represented as individual client LPARs 114A-114B within CEC 110A. According to the various illustrative embodiments, CEC 110A supports multiple clients and other functional operating OS partitions that are "created" within a virtualized environment. Each LPAR, e.g., client LPAR 114A, receives an allocation of specific virtualized hardware and OS resources, including virtualized CPU 205A, Memory 210A, OS 214A, local firmware 216 and local storage (LStore) 218. Each client LPAR 114 includes a respective host operating system 214 that controls low-level access to hardware layer (230) of CEC 110A and/or to virtualized I/O functions and/or services provided through VIOSes 112. In one embodiment, the operating system(s) may be implemented using OS/400, which is designed to interface with a partition management firmware, such as PHYP 225, and is available from International Business Machines Corporation. It is appreciated that other types of operating systems (such as Advanced Interactive Executive (AIX) operating system, a trademark of IBM Corporation, Microsoft Windows®, a trademark of Microsoft Corp, or GNU®/Linux®, registered trademarks of the Free Software Foundation and The Linux Mark Institute) for example, may be utilized, depending on a particular implementation, and OS/400 is used only as an example.

Additionally, according to the illustrative embodiment, CEC 110A also comprises one or more VIOSes, of which two, VIOS 112A and 112B, are illustrated. In one embodiment, each VIOS 112 is configured within one of the memories 233A-233M and comprises virtualized versions of hardware components, including CPU 206, memory 207, local storage 208 and I/O adapters 226, among others. According to one embodiment, each VIOS 112 is implemented as a logical partition (LPAR) that owns specific network and disk (I/O) adapters. Each VIOS 112 also represents a single purpose, dedicated LPAR. The VIOS 112 facilitates the sharing of physical I/O resources between client logical partitions. Each VIOS 112 allows other OS LPARs (which may be referred to as VIO Clients, or as Clients 114) to utilize the physical resources of the VIOS 112 via a pair of virtual adapters. Thus, VIOS 112 provides virtual small computer system interface (SCSI) target and shared network adapter capability to client LPARs 114 within CEC 110. As provided herein, VIOS 112 supports Virtual real memory and Virtual shared storage functionality (with access to Distributed storage repository 150) as well as clustering functionality.

Within CEC 110A, VIOSes 112 and client LPARs 114 utilize an internal virtual network to communicate. This communication is implemented by API calls to the memory of the PHYP 225. The VIOS 112 then bridges the virtual network to the physical (I/O) adapter to allow the client LPARs 114 to communicate externally. The client LPARs 114 are thus able to be connected and inter-operate fully in a VLAN environment.

Those of ordinary skill in the art will appreciate that the hardware, firmware/software utility, and software components and basic configuration thereof depicted in FIGS. 1A, 1B and 2 may vary. The illustrative components of DPS 100 and specifically those within CEC 110A are not intended to be exhaustive, but rather are representative to highlight some of the components that are utilized to implement certain of the described embodiments. For example, different configurations of data processing systems/CECs devices may be provided, containing other devices/components, which may be used in addition to or in place of the hardware depicted, and may be differently configured. The depicted example is not meant to imply architectural or other limitations with respect to the presently described embodiments and/or the general invention. The CEC 110 depicted in the various figures may be, for example, an IBM eServer pSeries system, a product of International Business Machines Corporation in Armonk, N.Y., running the Advanced Interactive Executive (AIX) operating system or LINUX operating system.

B. Cluster-Aware VIOS

Certain of the features associated with the implementation of a cluster aware VIOS (e.g., VIOS 112 of FIGS. 1A, 1B and 2) are introduced above with reference to the description of the previous figures, and particularly FIG. 2. Descriptions of the specific functionality of the VIOS 112 will continue to be provided with reference to the illustrations of FIGS. 1A, 1B and 2. As presented by FIG. 2, each VIOS 112 is a virtual machine instance that emulates hardware in a virtualized environment. The VIOS 112 is tasked with emulating SCSI storage devices, and the VIOS 112 provides client LPARs 114 with access to distributed storage repository 150 in cooperation with the PHYP 225. Configuration of the VIOS 112 is performed through the hardware management tools of HMC 229. SCSI storage devices support a set of commands that allow SCSI initiators the ability to control access to storage (150). Database programs, for example, may manage access to distributed storage repository 150 through a set of SCSI commands commonly referred to as persistent reserve. Other types of reserves are also supported by VIOS 112, and the collective group of such commands is referred to herein as reserve commands.

As provided herein, each VIOS 112 allows sharing of physical I/O resources between client LPARs, including sharing of virtual Small Computer Systems Interface (SCSI) and virtual networking. These I/O resources may be presented as internal or external SCSI or SCSI with RAID adapters or via Fibre-Channel adapters to distributed storage repository 150. The client LPAR 114, however, uses the virtual SCSI device drivers. In one embodiment, the VIOS 112 also provides disk virtualization for the client LPAR by creating a corresponding file on distributed storage repository 150 for each virtual disk. The VIOS 112 allows more efficient utilization of physical resources through sharing between client LPARs, and supports a single machine (e.g., CEC 110) to run multiple operating system (OS) images concurrently and isolated from each other.

In one or more embodiments, the VIOS operating system(s) is an enhanced OS that includes cluster-aware functionality and is thus referred to as a cluster aware OS (CA_OS). One embodiment, for example, utilizes cluster aware AIX (CAA) as the operating system. According to one embodiment, cluster-awareness enables multiple independent physical systems to be operated and managed as a single system. As provided within VIOS 112 of CEC 110A, VIOS 112 comprises cluster aware (CA) OS kernel 220 (or simply CA_OS 220), as well as LPAR function code 224 for performing OS kernel related functions for the VIOS LPARs 114. When executed within two or more nodes of DPS, CA_OS 220 enables various clustering functions, such as forming a cluster, adding members to a cluster, and removing members from a cluster, as described in greater detail below. CA_OS 220 manages the VIOS LPARs 112 and enables the VIOSes within a cluster to be cluster aware. CA_OS 220 comprises several functional modules. In the described embodiments, CA_OS 220 comprises cluster management (CM) utility 222 which supports the configuration of the VIOS to enable cluster-awareness and cluster-level functionality, such as redundant virtual I/O. Each of these additional software components of CA_OS 220 may be a functional module within CM utility, in one embodiment, and each module is thus described as such throughout the remainder of this specification. In one embodiment, CM utility 222 may be a separate utility that is locally installed or downloaded (from DB 140, for example) as an enhancement to an existing OS within a CEC 110 or VIOS 112, when initially configured for operation within the VIOS cluster. CM utility 222 is then executed when configuring the individual VIOS to create or join a cluster and/or become a cluster-aware node within the VIOS cluster. With this implementation structure, CM utility 222 enables the OS to support the various cluster-awareness and other cluster-level features and functionality. In an alternate embodiment, CA_OS 220 includes all the clustering features and functionality and established the various features when the CEC 110/VIOS 112 joins the cluster and/or during configuration of VIOS 112 to become cluster-aware.

In one implementation, functional components of CM utility 222 are encoded on local device storage of a corresponding VIOS 112, such that the VIOS 112 becomes automatically configured as a part of the VIOS cluster when the VIOS 112 is initially activated. On initial set up of the VIOS, VIOS API, kernel extensions and virtual adapters are configured within VIOS to enable communication with the other VIOSes, the VIOS DB 140, and with the distributed storage repository 150. During this initial setup of the VIOS 112, the VIOS executes a registration module of CM utility 222 to register VIOS 112 with the cluster. The registration module enables VIOS 112 to retrieve/download or have forwarded from DB 140 (on successful registration with the cluster) any additional CM software components and/or cluster-level information and/or data required to establish full cluster awareness when the VIOS has completed installation and is activated within the CEC 110. Thus, in one embodiment, in addition to the locally stored CA_OS components and software modules of CM utility 222, other functional components of CM utility 222 may be downloaded from DB 140 when CEC is powered on or when one or more VIOSes 112 are enabled on CEC 110. Once the VIOS 112 has completed its setup, one or more client LPARs 114 that are activated within CEC 110 may be assigned to VIOS 112, and VIOS 112 subsequently performs the various I/O operations initiated by the client 114 (as initiator) or directed to the client 114 (as target). Updates to the local VIOS data may periodically be made as changes are made within the VIOS cluster and/or as one or more new client LPARs 114 are added to the CEC 110 requiring VIOS support. In one embodiment, CM utility 222 may also enable retrieval and presentation of a comprehensive view of the resources of the entire cluster.

It is appreciated that while various functional aspects of the clustering operations are described as separate components, modules, and/or utility and associated data constructs, the entire grouping of different components/utility/data may be provided by a single executable utility/application, such as CA_OS 220 or CM utility 222. Thus, in one embodiment, CA_OS 220 executes within VIOS 112 and generates a plurality of functional components within VIOS 112 and within DB 140. Several of these functional components are introduced within FIG. 1B and FIG. 2 and others are described throughout the various embodiments provided herein. For simplicity in the descriptions which follow, references to CM utility 222 and CA_OS 220 will be assumed to be referring to the same general component (i.e., CM utility 222 being a subcomponent of CA_OS 220), and the terms may be utilized interchangeably throughout the specification.

As further presented by the illustrative embodiments (e.g., FIG. 2), VIOS 112 includes one or more additional functional modules/components, such as VIO adapter(s) (interface) 226, and virtual I/O drivers/utility 228, which provides I/O functionality to VIOS 112 and enables VIOS 112 to route data traffic to and from data structures and storage within distributed storage repository 150 and/or DB 140. Virtual I/O adapter(s) 226 and CM utility 222 also enable the VIOS 112 to provide each client LPAR 114 with access to the full range of storage accessible within distributed storage repository 150 and other cluster-supported functionalities, as described herein.

In the illustrative embodiment, each client LPAR 114 communicates with VIOS 112 via PHYP 225. VIOS 112 and client LPAR 114A-114B are logically coupled to PHYP 225, which enables/supports communication between both virtualized structures. Each component forwards information to PHYP 225, and PHYP 225 then routes data between the different components in physical memory (233A-233M). In one embodiment, a virtualized interface of I/O adapters is also linked to PHYP 225, such that I/O operations can be communicated between the different logical partitions and one or more local and/or remote I/O devices. As with local I/O routing, data traffic coming in and/or out of I/O adapter interface or network interface from a remote I/O device is passed to the specific VIOS 112 via PHYP 225.

With the above introduced system configuration of FIGS. 1A, 1B and 2, a first VIOS 112a (through a communication channel established via PHYP 225), grants access to another VIOS 112b through one or more virtual adapters. VIOS 112 includes the functionality to query PHYP 225 for the identity of the Client LPAR 114 on the CEC 110 where the VIOS 112 is currently running.

With the cluster aware VIOS infrastructure, different VIOSes 112 associated with different CECs 110 access the distributed storage repository 150 and cluster-level information is shared/communicated across the VIOS cluster (via VIOS DB 140) while each client I/O process is being performed. In this manner the VIOS associated with a first client on a first CEC is aware of which SAN disk resources are being accessed by a second client on a second CEC (or on the same CEC). With this awareness factored into the I/O exchange with the distributed storage repository 150, the VIOS associated with the first client can avoid accessing the same storage resource that is concurrently being utilized by the second client, thus preventing data integrity issues, which could potentially cause data corruption and client partition crashes.

Figure 5:
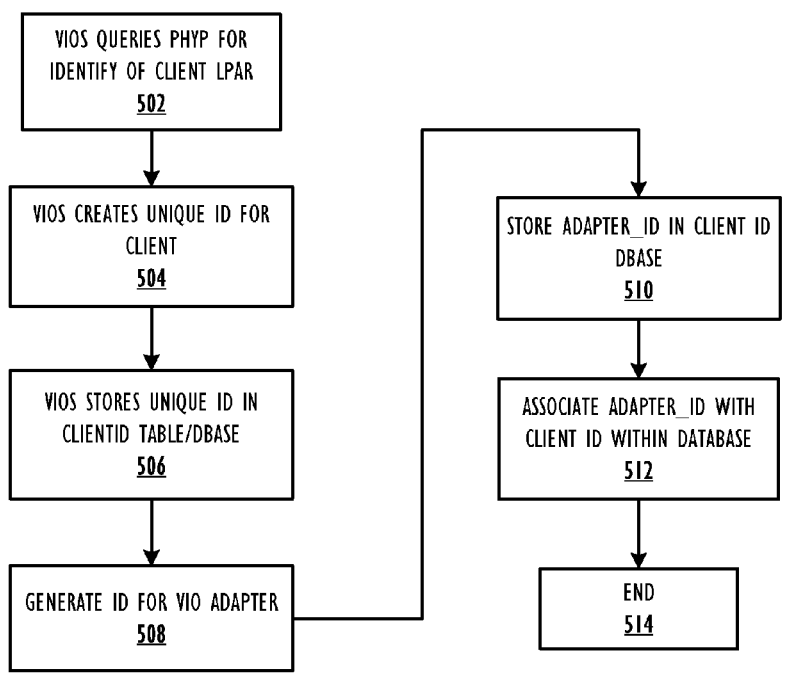
FIG. 5 is a high-level logical flowchart illustrating the method of registering a cluster-aware VIOS with the VIOS DB and VIOS cluster, according to one embodiment.

In one embodiment, VIOS functionality is enhanced to enable assigning of client identifiers (ID) and unique virtual I/O adapter IDs in a secure manner, while enabling storage pooling within virtual storage (within distributed storage repository 150). According to the described implementation, the different clientID-vioAdapterID pairings are unique throughout the cluster, so that no two clients throughout the entire cluster can share a same virtual adapter and no two vioAdapterIDs are the same within a single client. FIG. 5 is a flow chart illustrating the method by which a VIOS 112 on a CEC 110 with DPS 100 enables cluster level communication between a client LPAR 114 and distributed storage repository 150, according to one embodiment. The process begins at block 502 at which the VIOS 112 queries PHYP 225 for the identity of the client LPAR 114. At block 504, the VIOS 112 creates a unique identifier (ID) for the client (i.e., a ClientID). The VIOS 112 then stores the unique ClientID in ClientID data structure 159 (FIG. 1B) within DB 140 (block 506). The DB 140 and by extension the ClientID data structure 159 are accessible to each VIOS partition in the cooperating cluster (DPS 100). At block 508, the VIOS 112 also generates an identifier for each virtual IT nexus (virtual I/O AdapterID) that is utilized for each virtual adapter assigned to the client LPAR 114. In one embodiment, a client LPAR 114 can have multiple virtual adapters assigned thereto. These vio AdapterIDs are stored in the AdapterID data structure 183 (block 510) and are associated with their corresponding clientIDs (block 512). The method illustrated by FIG. 5 ends at termination block 514, with each clientID having been associated with the corresponding one or more vio AdapterIDs with DB 140.

As described herein, a cluster is a set of one or more networked VIOS partitions, where each VIOS within the cluster has access to a common set of physical volumes. The physical volume resides within the VIOS cluster and is utilized to provide block storage. Implementation of the cluster awareness with the VIOSes of the cluster enables the VIOSes to provide cluster storage services to virtual clients (client LPARs 114). The VIOS software stack provides the following advanced capabilities, among others: Storage Aggregation and Provisioning; Thin Provisioning; Virtual Client Cloning; Virtual Client Snapshot; Virtual Client Migration; Distributed Storage Repository; Virtual Client Mirroring; and Server Management Infrastructure integration. More generally, the VIOS protocol allows distributed storage to be viewed as centralized structured storage with a namespace, location transparency, serialization, and fine grain security. The VIOS protocol provides storage pooling, distributed storage, and consistent storage virtualization interfaces and capabilities across heterogeneous SAN and network accessible storage (NAS). In order to provide block storage services utilizing the distributed repository, each VIOS configures virtual devices to be exported to virtual clients. Once each virtual device is successfully configured and mapped to a virtual host (VHOST) adapter, the clients may begin utilizing the devices as needed. In one embodiment, the virtualization is performed utilizing POWER™ virtual machine (VM) virtualization technology, which allows the device configuration process to occur seamlessly because the physical block storage is always accessible from the OS partition.

C. CA VIOS Communication Protocol

One embodiment provides a communication protocol that enables efficient communication between the Clients 114 and distributed storage repository 150 via the respective VIOS 112 and virtual I/O adapters assigned within the VIOSes 112 to the specific client 114. The embodiment further provides storage virtualization and management via the specific communication mechanisms/protocols implemented with respect to the use of cluster awareness and the Distributed storage repository 150 such that the virtualization is presented within the context of the server (CEC 110) virtualization and management. With the presented protocol, different VIOSes 112 associated with different CECs 110 access the same single distributed DB 140 and cluster-level information is shared/communicated with each Client I/O process such that a first client on a first CEC is aware of which SAN disk resources are being accessed by a second client on a second CEC (or on the same CEC). With this awareness factored into the I/O exchange with the distributed storage repository 150, the first client can avoid accessing the same storage resource that is concurrently being utilized by the second client, thus preventing data integrity issues, which would potentially cause data corruption and client partition crashes.

The communication protocol provides a highly integrated server-based storage virtualization, as well as distributed storage across clustered VIOS partitions. This protocol comprises one or more query features, which enables dynamic tracking of storage resource usage across the entire cluster. Throughout the following description, the communication and management protocol shall be described as a VIOS protocol. VIOS protocol provides distributed storage across clustered VIOS partitions. With the VIOS protocol, the storage is considered as a one large storage pool which chunks of storage (i.e., logical units or LUs) allocated to each client 114. The VIOSes within the overall system (DPS 100) are now structured as part of the cluster, with each VIOS being a node in the cluster. Each VIOS node communicates with other VIOS nodes utilizing the VIOS protocol. With this configuration of VIOSes, when two or more client LPARs 114 belonging to different CECs 110 share storage on the SAN (e.g., two clients assigned overlapping LUs), the VIOS protocol enables each node to query (each client within the cluster) to determine the current usage of the storage device. When this information is received, the VIOS may then disseminate this information to other VIOSes. Each client is thus made aware of whether the SAN storage device that the client is trying to access is currently being used by some other client.

Figure 4A:
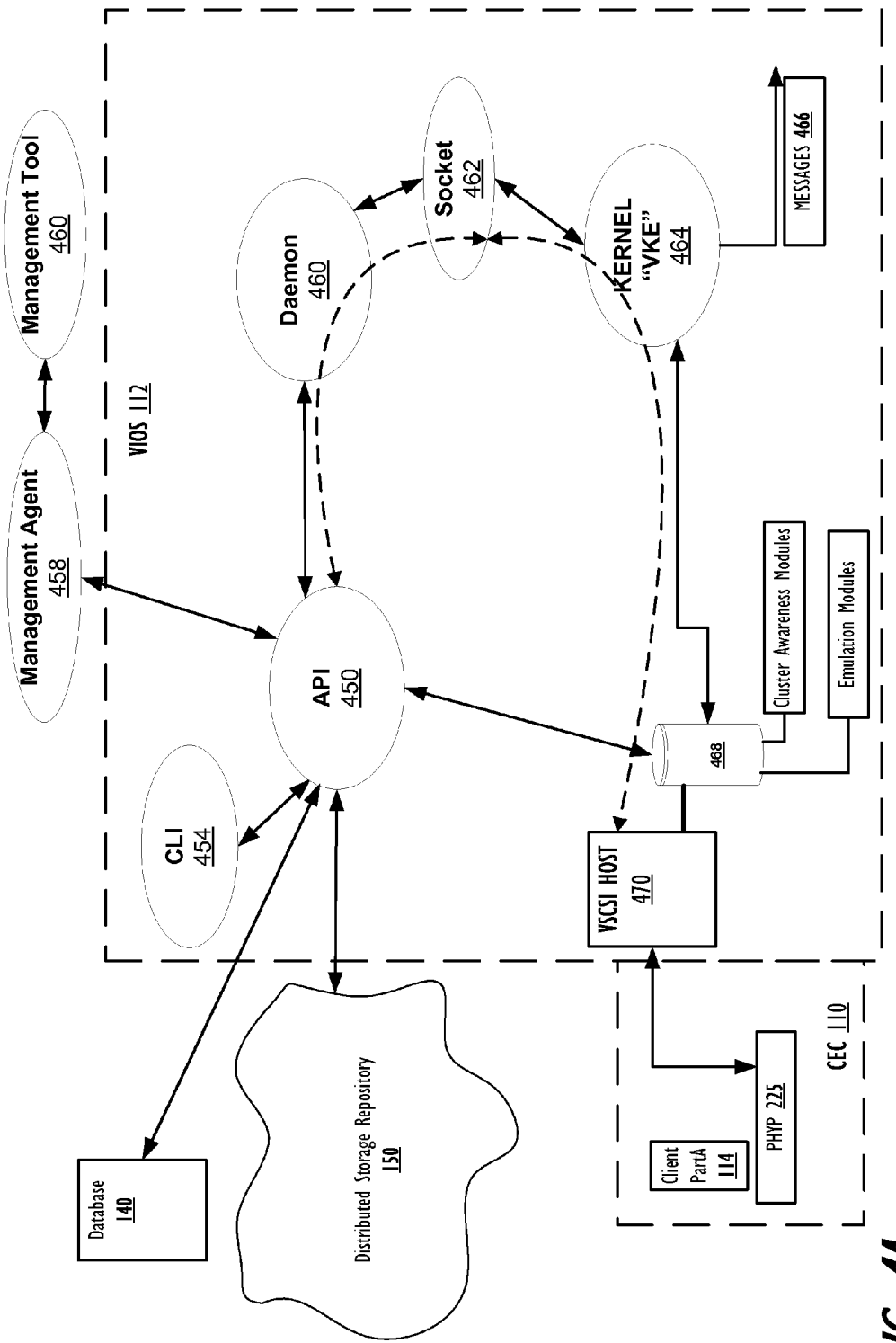
FIG. 4A is an expanded view of functional components within an example VIOS communication infrastructure including the VIOS application programming interface (API), Daemon, and vscsi kernel extension (VKE), according to one or more embodiments.

Referring now to FIG. 4A, there is illustrated an example VIOS communication infrastructure having an application programming interface (API) controlling the various exchanges between XML components over a virtual Small Computing Systems Interface (vSCSI) topology. Central to the Cluster/VIOS communication paradigm is a plurality of APIs, of which API 450 is provided in the illustrative embodiment. The VIOS API 450 is utilized to manage objects within a VIOS cluster. The API 450 includes the necessary information about how to connect to and/or exchange information with internal VIOS functional modules as well as with DB 140, DDS 150 and management tool 460. In one embodiment, management tool 460 is implemented within a cluster aware server module and includes server management sub-agents 458, which represents the structures utilized by the managing tool to communicate with the operating system. The internal functional modules within VIOS 112 comprises command line interface (CLI 454), Daemon 460, socket 462, kernel extension (vKE) 464, and vSCSI host 470. The vSCSCI host 470 includes the enhancements to VIOS 112 that enable the cluster aware functionality. These enhancements are illustrated as a connected block structure 468, by which advanced VIOS operations and emulation are provided, as described in greater detail below. VIOS 112 with its various internal components is connected within CEC 110 via PHYP 225, as previously illustrated by FIG. 2, described above.

Each component that connects with API 450 and makes one or more requests through API 450 is generally referred to as a "caller" throughout this specification. As presented by the figure, any one or management tool 460 (via management agent 458), CLI 454, Daemon 460, and vSCSI host 470 may be a caller requesting specific types of information exchange via API 450. In one embodiment, the API 450 comprises an XML interface as well as a C programming language interface. The various "callers" use the VIOS API 450 to initiate actions on these objects. Some actions may change the state of one or more objects in the VIOS cluster. The VIOS API 450 may be used by multiple callers at any given time. While callers are not aware of other callers using the VIOS API 450 and do not have the ability to notify all callers of actions that they initiate, the VIOS API event notification protocol provides cluster level awareness of caller modifications to prevent data contamination during processing of multiple caller requests. Callers that need awareness of actions taken on VIO objects are able to register for event notification and receive notification about changes to VIO objects that occur within the cluster. The callers then utilize the notifications as a trigger to go to the shared storage (DB 140) and retrieve the necessary information from the shared VIOS cluster DB 140 to keep the caller's locally stored VIO object data current. Additionally, in one embodiment, VIOS API event notification provides participating callers with results to actions that have occurred on one or more VIO objects. As described herein, these VIO object events are categorized as Lifecycle events or Alert events.

In one embodiment, to decrease the amount of APIs required be each consumer, only a few high level APIs are exposed. Each API provides various actions on an object by object basis. Interaction between the API 450 and a consumer (a caller receiving data in response to a requestor a caller registered to receive notification of an event) is performed by the consumer providing a VIO request extensible markup language (XML) buffer with sufficient amount of data provided in order for the request to be processed. Once the request has been processed, a VIO response XML steam is written back to the caller for response processing. When the response indicates a successful processing of the request, the XML steam contains the status and the requested object information that is needed. However, if the request fails, the response XML stream contains VIO exception information. The common format of each object API is to provide a vioRequest structure that contains the required information needed for request processing.

Returning to FIG. 4A, in the illustrative embodiments, a VIOS 112 emulates SCSI devices using a kernel extension (vscsi host kernel extension kernel extension) in the VIOS partition (which also includes the code/modules for providing VCSI host 470 and Daemon 460). VSCSI host 470 includes one or more driver(s) and sub-driver(s), which provide separate functions. A first set of drivers provides emulation functionality, while other drivers provide transport and messaging functionality. VSCSI host 470 includes VIOS enhanced operational functionality, illustrated via additional structure4 coupled to VSCSI host 470. Structure 468 includes software modules that enable the various messaging structures used for implementing VIOS cluster awareness functionality and VIOS/Client emulation. Client 114a logs into the VIOS 112 as part of the transport layer protocol. At the time the client 114a logs into the VIOS 112, the PHYP 225 provides information to the VIOS 112 regarding the identity (ID) of the client 114a relative to the CEC 110. The VKE 464 services SCSI requests sent by the VIOS 112 through a transport layer supported by PHYP 225. The kernel code does not complete the login request until the VKE 464 sends a message with the CEC-relative client ID using a socket 462 to Daemon 460, which is also running on the VIOS 112. VKE 464 also transmits other messages 466 within the cluster environment. The user daemon 460 has access through API 450 to Database (DB) 140, which is maintained by all VIOS partitions servicing the client(s) within the cluster.

Figure 4B:
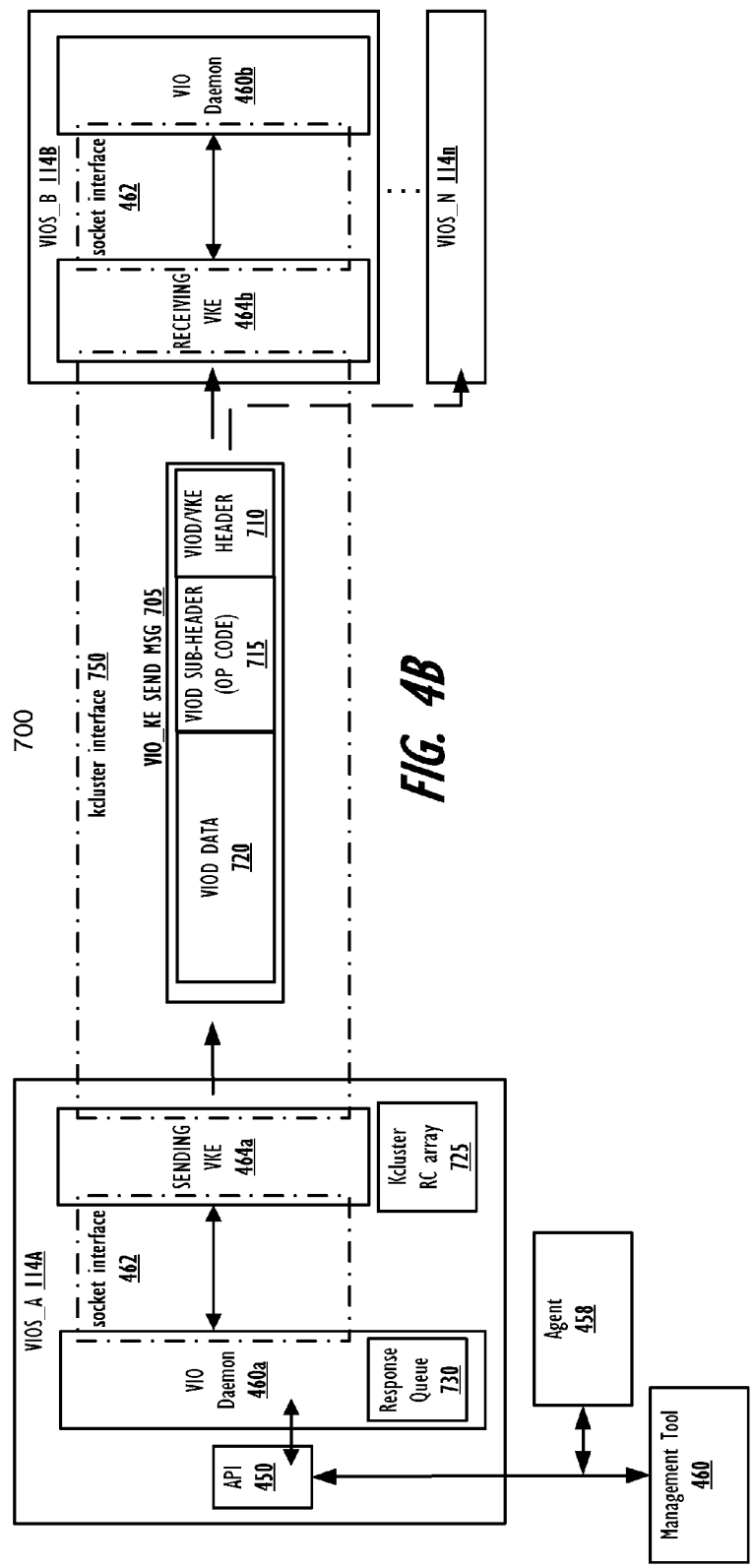
FIG. 4B illustrates an example cluster communication methodology for sending a cluster message between a sending node and a receiving node utilizing the VKEs and Daemons of the respective nodes, according to one or more embodiments.

Referring now to FIG. 4B, there is illustrated an example VIOS cluster communication scenario 700 in which (components of) a first VIOS 114A transmits a VIO kernext (KE) "send message" 705 to a second VIOS 114B. Specifically, as shown, VIOS Daemon 460a of VIOS_A 114A forwards a message (705) via socket interface 462 to sending VKE 464a of the same VIOS 114A. Sending VKE 464a transmits the Send Message 705 over the kcluster interface 750 to a receiving VKE 464b of the second VIOS 114B. Once the message 705 is received at the receiving VKE 464b, the receiving VKE 464b forwards the message to VIO Daemon 460b of the second VIOS 114B. The message passing capabilities extend between VIO Daemon 460a and API 450, to which management agent/tool 475/480 is shown to be communicatively coupled. The communication between management agent/tool 475/480 and API 450 is understood to supported be via a TCP socket connection.

In one or more embodiments, the Send messages 705 are generated by the VIOS Daemon, while received messages are consumed by the VIOS Daemon. The types of messages generated by the Daemon can vary and include (a) messages requiring receipt notification, (b) messages not requiring receipt notification, (c) messages requiring (or triggering generation of) a response message, and (d) messages that do not require such response messages. Additionally, the Daemon can specify whether the message type is a broadcast message (to be sent to all other VIOSes within the cluster) or a directed message (to be sent to one or more specific VIOSes within the cluster identified by the VIOS(es) respective IP addresses). In other embodiments, the messages can be generated by system administrator functionality via a command line interface (CLI) to the CA_OS of the sending VIOS. Thus, according to the described embodiments, the process for sending messages at the VIOS level can be provided via a first VKE system call command/interface. The first VKE system call (or interface) can also be utilized by the VIO Daemon (VIOD) to provide response information to metadata queries of vSCSI host driver 470. (FIG. 4A) In one embodiment, the same VIOD protocol header definition is utilized as with other interfaces with the VIOD. To send a message, the VIOS communication protocol defines a new opcode that indicates that the operation is a user space cluster message send operation.

The messaging/communication aspects of the described embodiments are implemented via both an intra-node messaging construct and an inter-node cluster communication protocol. Accordingly, the cluster software provides a mechanism to pass messages using a cluster messaging interface command. In order to limit the amount of data transmitted across the network, the communication protocol provides a cluster messaging interface to pass a request combined with a distributed file to pass the payload information for a given request. The payload file is optional and only used for requests that require payload information. With this protocol, the sequence of events for message passing includes the following:

(1) The node initiating the message builds a cluster messaging interface command and writes the payload to the message payload file. Most of the management of the file (including creating and deleting the file) is handled by the node initiating the message. However, a primary node is involved in error handling and clean-up operations.

(2) The initiating node sends the cluster messaging interface command to the target node.

(3) The target node receives the cluster messaging interface command and, as part of the action, reads the payload from the message payload file (based on the corresponding opcode).

(4) The target node completes the transaction and concatenates status to the end of the message payload file.

(5) The target node responds with completion to the initiating node.

(6) Based on the opcode and return code, the initiating node processes the status from the message payload file and then deletes the message payload file for this transaction.

As introduced above, when messaging for LCEs, the messaging packets include a payload (data) that is stored on the VIOS DB 140, which is utilized within the VIOS cluster to enable the various nodes to pass payload information from one node to another. The opcode determines if a message payload file is needed as well as the format and content of the data within the file. According to the described embodiment, each message includes message header information. Within the VIOS DB 140, the message payload files are organized based on the initiator node information. Included within the header information (or sub-header) is information indicating characteristics of the message payload file, such as whether the file is private, the node identifier (ID) of the initiator node, the type of message, and the filename or transaction ID.

D. VIOS Shared DB for Primary Node Election and LCE Notification

As described herein, implementation of the cluster awareness with the VIOSes of the cluster enables the VIOSes to provide cluster storage services to virtual clients (114). The VIOS software stack provides the following advanced capabilities, among others: Storage Aggregation and Provisioning; Thin Provisioning; Virtual Client Cloning; Virtual Client Snapshot; Virtual Client Migration; Distributed Storage Repository; Virtual Client Mirroring; and Server Management Infrastructure integration. More generally, the VIOS protocol allows distributed storage to be viewed as centralized structured storage with a namespace, location transparency, serialization, and fine grain security. The VIOS protocol provides storage pooling, distributed storage, and consistent storage virtualization interfaces and capabilities across heterogeneous SAN and network accessible storage (NAS). In order to provide block storage services utilizing the distributed repository, each VIOS configures virtual devices to be exported to virtual clients. Once each virtual device is successfully configured and mapped to a virtual host (VHOST) adapter, the clients may begin utilizing the devices as needed. In one embodiment, the virtualization is performed utilizing POWER™ virtual machine (VM) virtualization technology, which allows the device configuration process to occur seamlessly because the physical block storage is always accessible from the OS partition. When a virtual target device is removed, the local OS cache (local storage) data entries are deleted. Within the clustered environment, removal of any of the LUs is noticed to the other VIOSes. According to the described method, a distributed device repository and local repository cache are utilized to ensure the nodes within the cluster become device level synchronized from each node (VIOS) in the cluster.

According to one embodiment, information needed to configure a virtual target device (VTD) is stored in DB 140. This database (DB 140) can be accessed by all the nodes in the VIOS cluster, utilizing services provided by Cluster-Aware OS, such as but not limited to Cluster-Aware AIX (CAA). Additionally, certain small levels of cluster data are stored in a local database (ODM) (e.g., virtualized portions of storage 234, FIG. 2) on each node for the devices which exist on that node. This local storage is necessary in order for the processes running on the local node to be able to match the VIOS device with the correct information in the distributed database.

With information about each device being stored in the DB 140, operations on those devices can be performed from any VIOS node in the cluster, not just the node on which the device resides. When an operation on a device is performed on a "remote" (non-local) node (i.e. one other than the node where the device physically resides), the operation is able to make any changes to the device's information in the DB 140, as necessary. When corresponding changes are needed in the device's local database, the corresponding CM utility 222 enables the remote node to send a message (using cluster services) to the local node to notify the local node to make the required changes. Additionally, when a node in the cluster is booted up, or when the node rejoins the cluster after having been lost for any period of time, the node will autonomously reference the DB 140 in order to synchronize the data there with the local data of the node.

As an example, if an operation to delete a VIOS device from the local node is executed on a remote node, the operation will remove the information associated with that device from the DB 140, and send a message to the local node to tell the local node to remove the device from the local database. If the local node is down or not currently a part of the cluster, when the local node first boots up or rejoins the cluster, the local node will automatically access the DB 140, retrieve current data/information that indicates that the information for one of the local devices has been removed, and delete that device from the local database records.

FIG. 6 is a block diagram representation of functional components of a primary notification node, a second/initiator node and shared storage (VIOS DB 140) to enable cluster level information/data storage, management and exchange between the various nodes and VIOS DB 140 and synchronization of data by a management tool via a single communication point to the VIOS cluster. In one embodiment, a local copy of (relevant data of) VIOS DB 140 (such as cluster configuration data 184) is shared by each VIOS (node) within the VIOS cluster and stored in respective local DB 605a, 605b. Each VIOS 112 is then responsible for storing, maintaining and updating the data structures at DB 140 and in their respective local DBs 605. As illustrated by FIG. 6, VIOS DB 140 is accessible to the various VIOSes 112 (which are interchangeably referred to herein as nodes) and to management tool 180 within management console 175 via cluster communication fabric. VIOS DB 140 comprises several different modules of data, which may be arranged in a plurality of formats (e.g., tables, raw data, sequenced data, etc.). According to the figure, DB 140 includes a virtual adapter data structure 625, which maintains a listing of and configuration information about the virtual adapters. DB 140 also includes a second data structure that holds the unique adapter identifiers (AdapterIDs), and is therefore referred to herein as AdapterID data structure 183. DB 140 maintains a listing of and information about the individual VIOSes within a VIOS data structure 635. In one or more embodiments, each of the described data structures 625-635 can be or can include a table within DB 140. When a virtual adapter is first discovered, the cluster management (CM) utility 122 (FIG. 1B) creates a row within the virtual adapter data structure 625 and a row within the unique AdapterID data structure 183. These two rows in the different data structures are associated with each other, and the identifier (ID) is guaranteed to be unique. In one or more embodiments, adapter names are unique per CEC 110, and where VIOS partitions are not "mobile" (i.e., do not move from a first CEC to a second CEC), the adapter names can be identified using a CEC, name tupple. When a VIOS 112 is first configured, the VIOS downloads from DB 140 a copy of cluster configuration data 184d and cluster state/status data 186 from VIOS DB 140. VIOS DB also maintains an active nodes list 188, which includes all VIOSes that are functional within the VIOS cluster. According to one embodiment, once this information is gathered, any one of the nodes within the cluster can provide initial state information about the configuration and/or topology of the cluster. A management tool would thus be able to retrieve initial state information about a cluster by communicating with one of the VIOSes or with the VIOS DB to retrieved that information.

As further illustrated by FIG. 6, VIOS DB 140 comprises a plurality of additional data structures and/or components, which are utilized to allow for primary node election, registration of listeners and handlers for alert notification during cluster management and life cycle events, and enabling synchronization of data for a registered callers via a single primary notification node. Thus, FIG. 6 comprises message payload file (MPF) directory 670, within which message file 672 is stored. A local copy of message file 672 is also maintained within a local MPF directory 675 of second/initiator node 112b. Primary node also comprises management tool synchronization utility (MTSU) 680 by which primary node is able to perform the various synchronization functions for updating a registered management tool (caller) as LCEs occur within the VIOS cluster. According to one embodiment, the present of this functional block of code within CA_OS 220 is required for a VIOS to take on the role of a primary notification node. In one embodiment, an executable copy of MTSU 680 is stored on VIOS DB 140 and available for download to a VIOS that is to be utilized as a potential primary notification node for the VIOS cluster. Additional details of the use of these structures are described in Sections E, F and G below.

E. Autonomous Primary Node Election

Due to the potentially large number of VIOSes within the VIOS cluster, one or more embodiments provide a mechanism/methodology for managing events and actions within the system. According to one embodiment, a system and method are provided by which the various nodes within the VIOS cluster detect when there is a need for a primary node, elect a primary node, and subsequently trigger another election of a next primary node when needed. With this embodiment, the election process involves utilizing VIOS DB 140 and the message passing functionality enabled by the VIOS cluster to ensure that whenever possible there is a primary node assigned to maintain and provide cluster information about the nodes within the cluster and to the nodes. In the following descriptions, references made to a specific Primary Node will be directed to VIOS 112A of FIG. 2A. One or more of VIOS 112B or VIOS 112C then represents the secondary nodes described within the following description.

Referring again to FIG. 6, VIOS DB 140 comprises a plurality of functional structures/modules and/or data associated with the primary node election process described herein. As shown, VIOS DB 140 comprises primary node ID 662 and elector ID 665, both of which provides specific functions defined hereafter. Additionally, each VIOS comprises a plurality of components that supports the primary node/secondary node configuration of a VIOS cluster. As provided, within CA_OS kernel 220 of each VIOS 112 is cluster registration utility 156 and CM utility 222. CM utility 222 then comprises node monitor/report utility 610, liveliness notifications 650 and alerts 655. When a VIOS is configured to operate as a primary node, that VIOS also comprises primary node election/operation utility 615 and either or both primary notification module 640 and primary clean up module 642.

Figure 7:
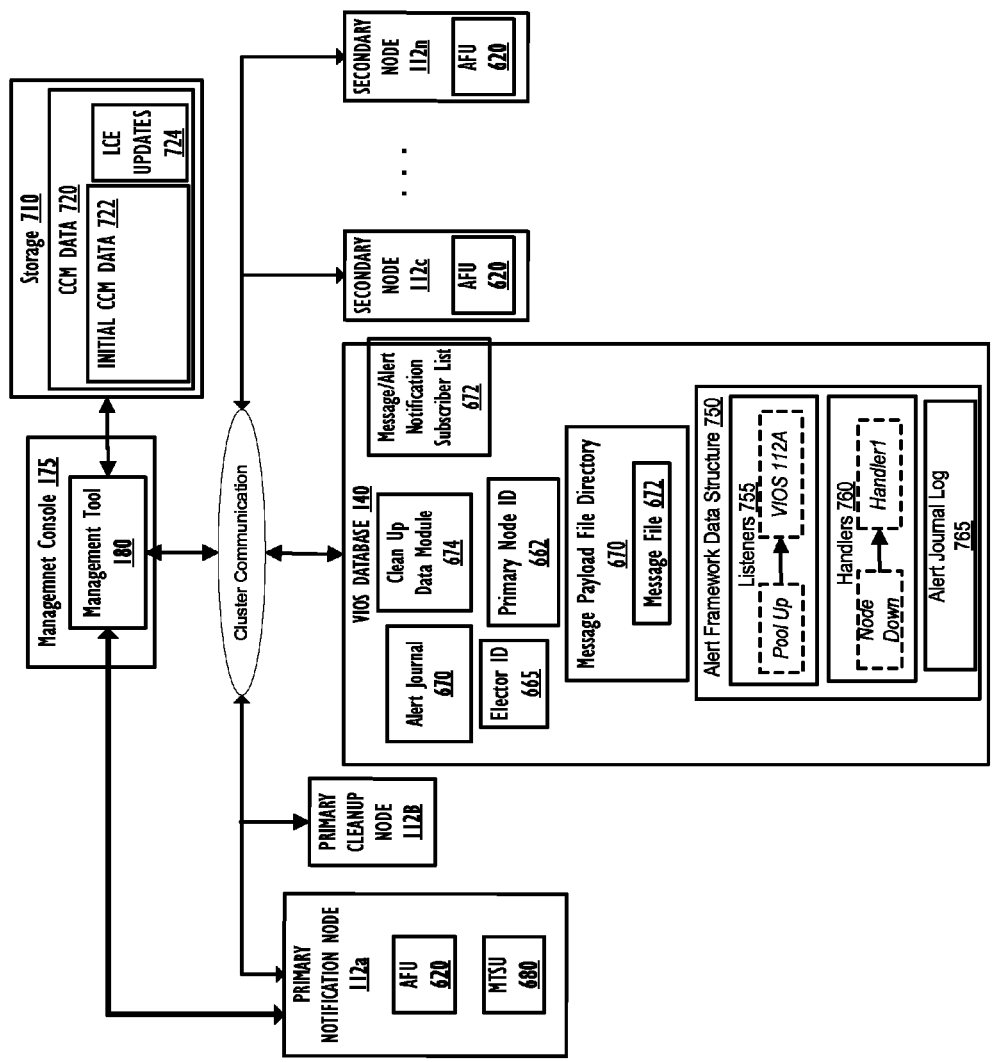
FIG. 7 is a block diagram representation of a primary node view of a VIOS cluster, with alert and notification components within the VIOS DB to enable registration of management tool with the primary notification node as a listener for automatic updates of life cycle events occurring within the cluster, according to one embodiment.

Utilization of a primary node provides a benefit of scalability for cluster environments in large configurations. According to one embodiment, the VIOS cluster environment incorporates role specific VIOS nodes that provide services to other VIOS nodes in the cluster. Among the roles (and associated functionality) that are provided by one or more VIOS nodes are the roles of: posting life cycle events; posting alerts; journaling alerts; and providing Database and general clean up, among others. In one embodiment, each role can be performed by a separate primary node, such that an unlimited number of primary nodes may be defined within the cluster. The number of primary nodes can be based on the functionality needed, and each function could, in one or more embodiments, have a separate primary node assigned to perform that particular function. According to the illustrative embodiment, and as illustrated by FIG. 7, the above roles can be provided by two primary nodes, Primary Notification node 112a and Primary Clean-up node 112b. Each node that is elected to the role of primary node first meets specific pre-established requirements.

Assigning a VIOS the role of primary node is provided through an election process. In the presented embodiment, a first VIOS/node detects that a primary node election is needed and the first node initiates the election process. When the node detects that an election is needed, the node checks its own configuration parameters against the requirements published for a node to become the primary node. The node determines whether the node itself meets the requirements (e.g., by having a pre-established set of primary node modules/data configuration) to allow the node to become the primary node. If the node does not meet the established requirements, the node becomes the elector node and activates a discovery process that discovers and notifies a next node (e.g., from within the elector order list 667) of the need for a primary node (710). The next node may then become the candidate node if the next node meets the requirements to become a candidate.

According to one embodiment, a VIOS has to meet several requirements to qualify to become designated or elected as a primary (notification) node, including one or more of the following non-exclusive list of requirements: (a) the node must be a part of the VIOS cluster; (b) the node must be part of the VIOS DB cluster and have the ability to write the event payload to the VIOS DB file; and (c) the node should have one or more TCP socket connection(s) established with the required callers (e.g. management tool 180, FIG. 4A).

When the node meets the established requirements, the node determines whether the primary node ID field is locked in the VIOS DB 140 by another node. If the primary node ID field is locked, the node sets a primary node election timer to track the elapsed time since the node last attempted to become the primary node. The timer expires after an amount of time (e.g., a pre-set time period elapses) that is either a design choice or dynamically determined based on the number of nodes within the cluster and/or other quantifiable factors. Assuming that no other node has locked the primary node ID field, the node locks the Primary Node ID field 662 within VIOS DB 140 and the node initiates the primary node commit process. The node sends a COMMIT signal to VIOS DB 140 and updates the primary node ID field with the node's own unique ID. The node then unlocks the Primary Node ID field 662.

When the established primary node prepares to take any "primary node specific" actions, the primary node first generates and issues a query to VIOS DB 140 to ensure that the node is (still) the primary node before the node takes the action. For example, before the primary notification node posts a life cycle event (LCE), the node will issue a query to VIOS DB 140 (and specifically to check the value of the Primary Node ID stored within the Primary Node ID field 662) to confirm that the node is still the Notification Primary Node (i.e., checking that the node's ID matches that stored as the Primary Node ID). If another node has committed as the primary, the node retrieves the primary node ID from the primary node ID field and updates the node's local copy of the primary node ID.

When a primary node no longer meets the requirements to be a primary node, the node undertakes the process or relinquishing the primary role. The process involves the primary node updating the Primary Node ID in VIOS DB 140 to a null/zero value and discovering the next candidate in the ordered list 188, as previously described.

According to the described embodiments, one or more triggers initiate the primary node election process when there is no primary node elected or the present primary node cannot fulfill the primary node role. Among these triggers are those presented within the following non-exclusive list:

(1) The primary node is no longer part of the VIOS cluster. The VIOS cluster alert functionality provides notification if a node is removed from the VIOS cluster;

(2) The primary node is no longer part of the VIOS DB cluster. The cluster DB (DB 140) alerts must be listened to by all nodes, and only the primary node forwards these alerts. If an alert is received by a non-primary node, the non-primary node checks the Primary Node ID 186, and if the Primary Node ID 186 is 0, the node initiates the election process;

(3) The primary node no longer meets the requirements for the primary role. As an example, the Primary Notification node may lose socket connectivity to required callers;

(4) An action taken by a node causes that node to meet the requirements for the primary role. As an example, the Primary Notification node has the socket connection from required callers registered;

(5) A non-primary node detects failures while requesting services from the primary node;

(6) A non-primary node detects that there is no primary node elected after a start or restart of the VIO daemon. When the system is in a state where no primary node has been elected (e.g., at system startup or following an election failure), the start or restart of the VIO daemon forces the VIO daemon to load the Primary Node ID into the local memory. If the Primary Node ID is zero, then the local node initiates the election process.

Election of a Primary Notification Node also occurs in response to the following conditions: (1) When a LCE event or alert is received by a node, the daemon checks if there is a primary node. If there is currently no primary node, then the VIO daemon initiates the election process; and (2) When a caller registers a socket for event notification, the VIO daemon checks if there is a Primary Notification Node, and the VIO daemon initiates the election process if there is no primary notification node.

F. Single Point, Scalable Data Synchronization for Cluster Management

The above described infrastructure of a VIOS cluster having mechanisms for autonomously electing primary nodes, including a primary notification node and the communication facility for monitoring events within the cluster and passing relevant event information to the primary node. A further enhancement provides for a management tool to scalably synchronize collected cluster data (cluster configuration and management (CCM) data) by registering with a single point of access to the cluster, the primary node, for synchronized updates of events occurring within the cluster. Specifically, as described hereinafter, embodiments are presented for a method and framework to provide notification to a management tool for addition, modification and removal of data objects on the VIOS cluster. The embodiments provide for scalability via the utilization of a primary node that provides all notification information to the management tool, as such events occur, and if needed, the primary node also signals to the management tool to re-synchronize the management tool's data store.

FIG. 7 provides a more comprehensive view of the association of a management tool with the VIOS DB 140 and primary and secondary nodes of a VIOS cluster to enable the management tool to gather/receive synchronized information of events occurring on the VIOS cluster to enable more efficient management operations via the management tool. For simplicity, no specific description is provided of the various overlapping components within the VIOSes and VIOS DB with the FIG. 6 illustration. In addition to those components that were previously introduced in the FIG. 6 description, VIOS DB 140 also includes message payload file directory 670, which can comprise one or more message files 672 generated by a node experiencing or detecting an occurrence of a LCE. VIOS DB 140 also comprises alert framework data structure 750, within which a listing of the different listeners 755 and handlers 760 are maintained as well as an alert journal log 765. Within the alert/messaging framework, one or more applications and/or devices register (listeners) within the VIOS cluster detect when a specific type of event occurs and another application or device can register (handlers) to perform a specific response to the occurrence of a specific event (e.g., to notify another application and/or device/component that the event occurred). This framework of listeners and handlers operates within the primary node secondary node paradigm to allow an elected primary node to perform all notification for the entire cluster regardless of which node detected the event's occurrence. A second application/device may thus register (as a caller) with the primary node to receive notification of events occurring throughout the entire cluster. For purpose of the following embodiments, the management tool 180 is defined as a registered caller, and the management tool 180 registers with a primary notification node to receive LCEs occurring on the entire VIOS cluster.

As shown by FIG. 7, associated with management tool is a management tool accessible/associated storage 710. This storage may be local to the management console or remotely connected. Regardless, within the present embodiments, management tool 180 first performs a discovery of the entire VIOS cluster via connecting to one or the various nodes of the cluster. As a result of the discovery operation, management tool receives initial cluster configuration and management (CCM) data 722, which management tool stores within storage 710. Management tool then registers with primary notification node 112a to autonomously receive LCE updates 724, as those updates occur within the VIOS cluster. These LCE updates are also stored within storage 710 and together with the initial CCM data 722 make up a current view of CCM data 720 of the VIOS cluster. As provided herein, management tool 180 connects to and registers with the primary notification node 112a via a TCP socket connection to the API of primary notification node 112a

During an election of a Primary Event Node, when a socket connection (e.g., TCP socket, UNIX socket, etc.) to the required callers does not exist, the node sends a registration message/request to a defined UNIX socket for the caller to register a socket. Also, during the election process any LCE that arrives at VIOS DB 140 will be lost. Then, following its election as the primary node, the node that wins the election process issues a resend/re-synchronize message to the caller(s) whose LCE was lost during the primary node election process.

Once the primary node is elected, the primary node undertakes to perform several tasks/functions dependent on the services the primary node provides. An example of these tasks/functions are a notification function by which the primary node broadcasts an election complete message with an election success status, including the primary node's ID and primary node role (e.g., notification or/and cleanup role), to the other VIOSes within the cluster. This broadcast is only performed by the newly elected primary node. Each non-primary (secondary) node that receives this message updates the node's local memory with the new Primary Node ID, and the non-primary node also stops any election timing the node may have initiated. Another task/function performed by the newly elected primary node involves taking role specific actions. Specifically, a Primary Notification Node issues the caller resynchronization message/request to the caller on the socket after the election completion message is returned. This resynchronization notification is needed because any events that occur during the election process may be lost. Also, the Primary notification node listens to and posts Alerts. The Primary Cleanup Node performs the tasks of: gathering the active node list and take actions based on inactive nodes; cleaning up database entries; performing clean up based on journal entries (future); and listens to and journals alerts. Once a primary node is elected, the non-primary nodes automatically stop their respective election process timers and load the new Primary Node ID into their respective node local memory. In one embodiment, the Primary Notification node reads the journaled alerts and posts all alerts that occurred during the election process to management tools.

Thus, implementation of the various embodiments provides a method and protocol to provide a scalable notification framework that allows the management tool to keep the management tool's data store synchronized with managed resources on all VIOS nodes in the VIOS cluster. Within the messaging and notification framework introduced above, each management tool (or other component) that utilizes the notification framework is referred to as a registered caller or caller. Within this framework, the VIOS providing the functions of the primary node is responsible for sending events to registered callers, and in one embodiment, only the primary node sends events to the one or more callers to prevent overlaps in the information received by the caller. Any event of interest (e.g., life cycle events, LCE) that are recorded or seen on a non-primary node within the cluster is forwarded to the primary node. The primary node then posts the events of importance to a registered caller (via subscription of the registered caller for receipt of notification of such events) to the TCP socket of the registered caller(s). As defined herein, a life cycle event is an event occurring within of affecting one of a node, a connection, one or more partitions serviced by the node, or a resource of the cluster that changes the configuration of the cluster and which can affect one or more operations of the node, the specific resource, or the cluster as a whole. Life cycle events track creation and destruction of particular resources within the cluster. Specific examples of LCEs comprise: adding a node to the cluster; removing a node from the cluster; creating a resource such as a logical unit (LU); and removing a resource (logical unit). Other events that may be of interest (but are not life cycle events) include (but are not limited to): a loss of communication between one or more VIOS with (a) each other, (b) the VIOS DB 140, (c) the shared repository 150; and a failure of the VIOS that prevents the VIOS from being able to continue to provide I/O functionality for one or more assigned client LPARs. By registering to receive LCEs from a single node within the VIOS cluster, the management tool can quickly respond to received user requests because a local cache of resources (configuration) available within the cluster can be managed without polling the large number of nodes within the cluster.

Within the VIOS cluster, posting of LCEs involves several actions. In one or more embodiments, these actions assume that a caller has already registered the caller's TCP socket connection for event notification from the cluster and that the primary node for event notification has been elected. According to the notification protocol, only the primary node sends LCEs to the registered caller. This condition limits the number of LCE the caller sees for a single action and also prevents flooding of the network. In one or more embodiment, certain actions taken through the VIOS API can cause a LCE. These actions then cause the VIOS API to send notification to the VIOS daemon that a LCE needs to be posted to registered callers. The VIOS API sends the message header and payload to the VIOS daemon utilizing a Unix socket. Also, the VIOS API utilizes a special LCE opcode to notify the VIOS daemon that the request is for a LCE.

Figure 8A:
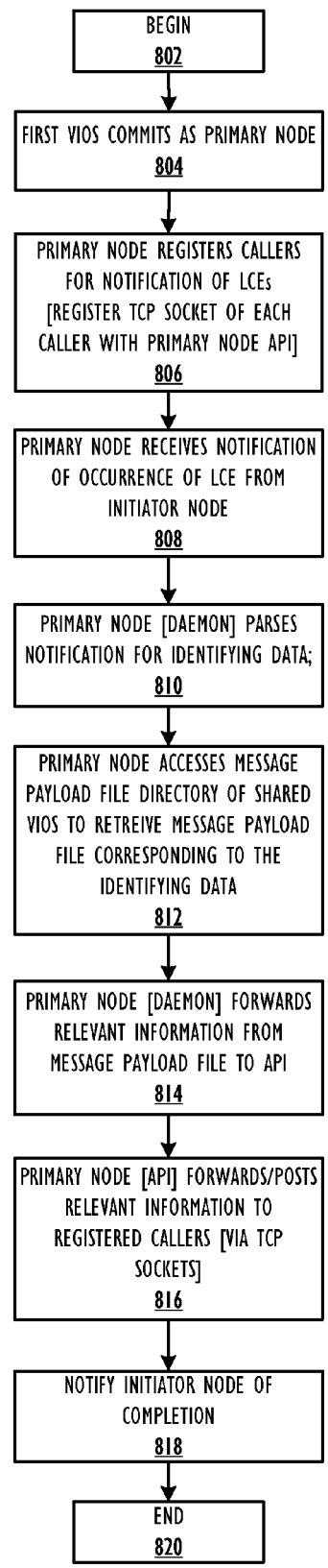
FIGS. 8A-8C are high level logical flowcharts of methods by which a primary node performs various notification functions to received information about life cycle events (LCE) occurring on the cluster and notify registered callers about the LCEs, according to various embodiments.

FIG. 8A illustrates the method by which the management tool is able to receive notification of updates occurring within a VIOS cluster by registering with a single primary node for notification of specific life cycle events. The primary notification node becomes a single conduit by which the management tool is able to maintain synchronization of current cluster configuration and topology and updates occurring with both. The method begins at block 802 and proceeds to block 804 at which the first VIOS commits as a primary node of the VIOS cluster and informs the other nodes that it is a primary node. The first VIOS then registers one or more callers to receive notification from the first VIOS of specific LCEs occurring within the cluster (block 806). According to the described embodiments, the callers include, but are not limited to the management tool 180, which registers the TCP socket of the management tool with the API of the primary node.

Figure 8B:
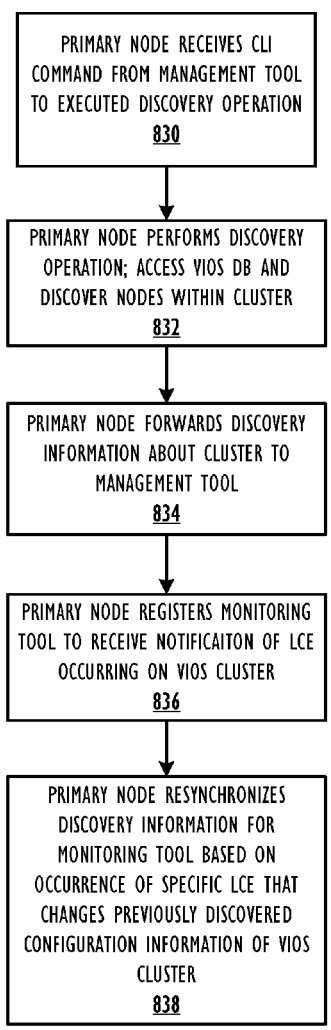

As introduced above, the one or more registered callers comprise a management tool and the one or more specific events are life cycle events (LCE). As further shown by FIG. 8B, registering the callers comprises a series of registration activities. The method begins with the management tool connecting to the primary node and forwarding a request to receive configuration information about the VIOS cluster and to be registered for notification of changes to such configuration and other events of interest to the management tool (generally referred to herein as life cycle events). The primary node (API) receives via the command line interface a command from the management tool to execute a discovery operation (block 830). Responsive to receiving the discovery request from the management tool, the primary node initiates/facilitates the discovery operation of the management tool by accessing the VIOS DB and discovering each node within the VIOS cluster (block 832). The primary node then forwards the results of the discovery operation to the management tool (block 834). Specifically, the primary node returns to the management tool via the API a listing of each node within the VIOS cluster and one or more additional information about the VIOS cluster and/or one or more of the nodes within the VIOS cluster. The primary node then registers the management tool for receipt of notification of an occurrence of each LCE occurring within the cluster and/or on the nodes of the VIOS cluster (block 836). The primary node then triggers periodic resynchronization operations of the management tool whenever a life cycle event of relevance to the management tool, which modifies the previously discovered VIOS configuration/topology occurs (block 838).

Returning now to FIG. 8A, the primary node then receives notification from an initiator (second) node of an occurrence of one of the specific LCEs (block 808). The primary node parses the received notification for identifying data/information (block 810). Using the identifying data, the primary node access the message payload file directory within the VIOS DB 140 and retrieves the message file corresponding to the identifying data (block 812). The daemon of the primary node then automatically forwards relevant data from the message file to the API (block 814), and on receipt of this information, the API forwards/posts the information to the registered callers, namely the management tool, via their respective TCP socket interfaces (block 816). The primary node then notifies the initiator node that the notification process has completed (block 818). The process then ends at block 820. With the above process, the management tool is able to register with a single device within the entire cluster and maintain synchronization of the relevant data about the various devices within the entire cluster.

In one embodiment, the primary node performs the standard checks of a primary node before performing any primary node tasks. When the current primary node determines that the node no longer meets the requirements to be the primary node, the node initiates a primary node election and withholds the forwarding of information to the registered callers of any received event notification. Also, in response to determining that the first VIOS is no longer the primary node, the node forwards a request to the new primary node to issue a resynchronization command to allow the callers to register with the new primary node.

According to one embodiment, if the primary node initiates processing of a remote LCE request and determines that the node is no longer the primary node, the primary node logs an error within the VIOS DB and fails the request. This feature is provided to prevent loops when handling LCE for remote nodes and to ensure the remote node is aware of which node is the current primary node.

The internal message passing features of the primary node occurs between the API and the daemon of the primary node via the communication protocols described with reference to FIGS. 4A and 4B. The daemon receives the payload of the message sent by the API, and the daemon checks whether or not the node is currently the primary node. In response to the daemon determining that the node is the primary node, the daemon builds a corresponding Event Notification Payload from the received LCE (message payload). The daemon then determines which callers are registered to receive notification of LCEs, and the daemon sends the event notification payload to the registered TCP socket(s) of the registered caller(s). Following the transmission of the LCE notification to the registered caller(s), the daemon then generates and forwards an API response message with status information that is sent to the initiating node.

If the daemon determines that the daemon does not reside on the primary node (i.e., the daemon is on a non-primary node of the cluster), the daemon packages the LCE within a message and forwards the message (via respective send and receive VKE's) to the daemon of the primary node (block 812). In one embodiment, this process can involve one or more functions performed by the non-primary node. The non-primary node retrieves the primary node ID and then writes a message packet containing the message header and payload information to a LCE payload file within VIOS DB 140. The non-primary node then sends the LCE request and/with the location of the message packet to the primary node using the cluster messaging interface command (over the kcluster interface). When received by the primary node, the cluster message interface command is processes for the received LCE request. First the command reads the LCE packet from the LCE payload file at the VIOS DB 140, and then the command calls the VIOS API to forward the request to the VIOS daemon. The VIOS API builds the request similar to the initial LCE request, with the opcode of the re-built LCE request changed to indicate to the primary node that the API is posting the LCE on behalf of a remote node. In one embodiment, the node ID field in the message header identifies the node that initiated the LCE request. The VIOS daemon then sends the LCE packet to the TCP socket of the registered callers. Following completion of the LCE, the primary node returns the status to the calling/initiating node. On receipt of the status message, the calling node (i.e., the node that forwarded the LCE request to the primary node) deletes the LCE payload file from the VIOS DB 140 and returns the status to the VIOS API of the initiating node (which would typically be the calling node).

When the primary detects a node drop alert, the primary node first checks the message payload file directory for a payload entry associated with the node that dropped. If payload files exist for the dropped node, the primary node issues a caller resynchronization command to the associated callers. In an alternate embodiment, the primary node reads the message files and posts the LCE for each file. This alternate embodiment, however, assumes that the file has been completely written before the node dies. For those instances in which the file is incomplete a caller resynchronization command has to be issued. Where the initiator node writes the payload file to the VIOS DB 140 then crashes before being able to send the payload file to the cluster messaging interface, the initiator node can perform the cleanup of the message payload files, either on reboot or re-entrance into the cluster.

The existence of the message file within the VIOS DB 140 indicates that the node that dropped had successfully completed the API request and did not have time to clean-up the message file before the node went "down". This also implies that the node has not yet returned the status of the request to the caller. Thus, the object has changed and the caller has not been made aware of this change, necessitating the resynchronization of the registered callers. The caller resynchronization provides this notification of the change to the various registered callers. Also, the initiator node can cleanup the message payload files on reboot of the initiator node or re-entrance of the initiator node into the cluster.

In the situation where there are no messages files associated with the down node within the VIOS DB 140, the primary node does not need to take any further action. Additionally, in the situation where the node that dies is the primary node, there will be no message payload file. As the LCE may or may not have been posted to the caller(s), the new primary node issues a caller resynchronization command after the new primary node is elected.

Figure 8C:
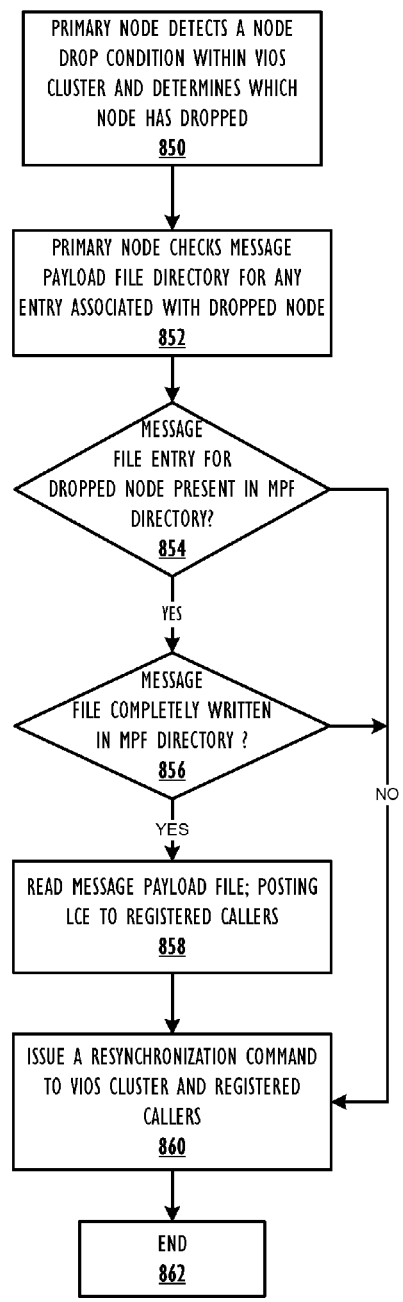

FIG. 8C illustrates a method by which a primary notification node responds to detection of a node drop to allow the management tool to receive information about the node drop condition. The method begins at block 850 at which the primary node detects/receives a node drop alert from within the VIOS cluster and determines which node has dropped from the VIOS cluster. The primary node then checks the message payload file (MPF) directory for entries associated with the dropped node (block 852). At decision block 854, the primary node determines if the check of the message payload file directory returned a message file associated with the dropped node. In response to the existence of a message file associated with the dropped node, the primary node: determines whether the message payload file was completely written before the node dropped; and in response to the file having been completed written before the node dropped, the primary node reads the message payload file and posts the LCE notification to the registered callers (block 858). The primary node then issues a resynchronization command to the cluster and the registered callers (block 860). The process then ends at block 862.

Figure 9:
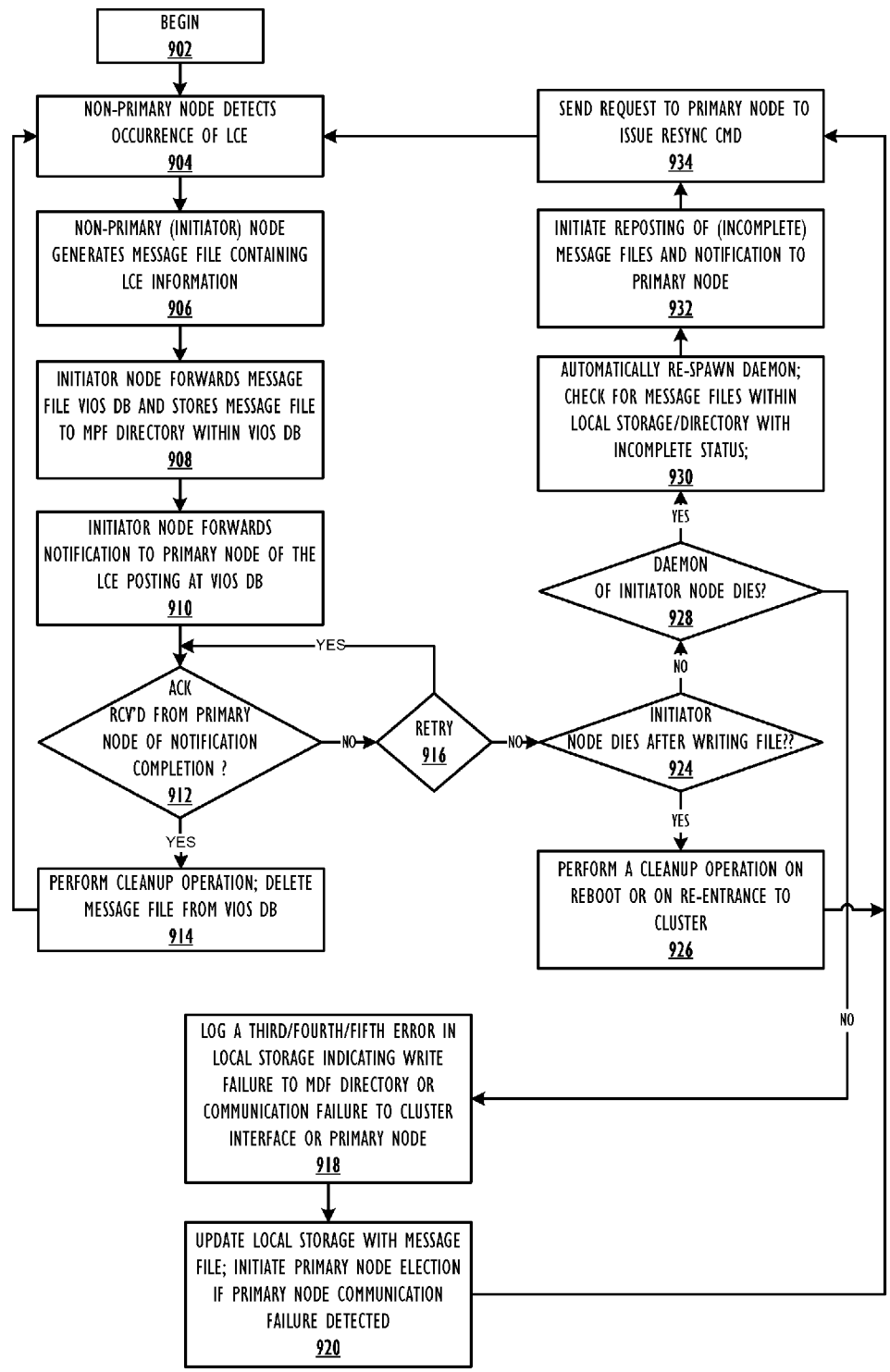
FIG. 9 is a high level logic flow chart of an example methods by which the non-primary node responds to an occurrence of one or more error conditions during LCE notification, according to various embodiments.

Several features of the described embodiment require the operation of an initiating node to generate the LCE and post the message file to the VIOS DB, among other functions. FIG. 9 illustrates the method by which certain of these functions are completed, including responses to error conditions detected while the initiating node (or primary node) is attempting to post an LCE event. The method begins at block 902 and proceeds to block 904 at which the non-primary node detects an occurrence of a life cycle event (LCE) affecting the first VIOS and/or one or more partitions serviced by the first VIOS or a second VIOS. The non-primary node becomes an initiating node and generates a message file containing information about the LCE (block 906). The initiating node then forwards the message file to the VIOS DB and stores the message file to the MPF directory (block 908). The initiator node then forwards a notification message to the primary node to inform the primary node of the occurrence (completed or pending) of the LCE (block 910). The initiating node then waits for receipt of an acknowledgement from the primary node notifying the initiator node of completion of the notification process, and the initiator node determines at block 912 whether the acknowledgement message has been received. When the acknowledgement message is received, the initiating node performs a cleanup operation to delete the message file from the VIOS DB (MPF directory) as well as from the local storage/repository of the initiator node (block 914). In one embodiment, the acknowledgement from the primary node indicates completion of an API request by the primary node involving receipt of the message file from the VIOS DB In response to not receiving an acknowledgement within a timeout period, which may include a retry of the notification (as indicated at block 916), one or more error conditions are assumed to have been encountered. These error conditions are described below, with occasional references back to the reminder of the flow chart.

Various different embodiments account for the occurrence of several different errors (or possible error scenarios) that can be encountered when sending a LCE. In a first error scenario, the initiator node dies before the API request is completed (no result of block 924). In a related error condition, the initiator node dies after writing the message file to the MPF directory (yes result of block 924) and the initiator node then performs a cleanup operation on reboot or re-entry of the node to the cluster (block 926). With this possible error condition, the primary node continually listens for node drop alerts and responds accordingly, as described above with reference to FIG. 8C.

Another error condition that can negatively affect the caller notification process involves the scenario where the daemon of the initiator node dies (block 928). In one or more embodiments, the VIOS daemon is configured to automatically re-spawn itself if the daemon dies (block 930). This re-spawning capability allows the daemon to perform special processing when the daemon is initially started or re-spawned. Once initiated or re-spawned, the daemon first checks if any files exist in the local node's message payload directory (block 930). If there are files within the local message payload directory, the daemon can check the files for status information. If the status is incomplete, the daemon becomes aware that the message has not been posted to the VIOS DB. The daemon can then re-send the LCE (block 932). In the scenario where the daemon dies on the primary node, then the primary node has to relinquish the primary role and initiate the primary election process once the daemon re-spawns itself. Also, when a non-primary node detects files in the payload directory that are incomplete, then the non-primary node will forward a request to the primary node for the primary node to issue a caller resynchronization command (block 934).

Another error condition that is accounted for within the messaging framework is an error in which a non-primary node cannot write to the message payload file (block 918). The non-primary node logs the error and forwards a request to the primary node to issue a caller resynchronization command (block 934). In an alternate embodiment, the initiator node can attempt to post the LCE locally (within the node local storage repository) (block 920). Then, in response to the initiator node not being able to post the LCE to its local storage, the initiator node requests that the primary node issue a caller resynchronization command (to initiate a caller resynchronization event).

Yet another error condition involves the return of an error from the cluster messaging interface (kcluster interface) (block 918). In response to a non-primary initiator node receiving any error from the cluster messaging interface command, the non-primary initiator node logs an error and initiates the primary election process (block 920). In an alternate embodiment, the initiator node can attempt to post the LCE locally. As with the previous error condition, should the initiator node fail in the attempt to post the LCE in its local storage repository, the initiator node requests the primary node initiate a caller resynchronization event (block 934). The initiating node then initiates the primary election process (block 920)

Yet another error condition involves the non-primary initiator node experiencing a communication error with the primary node (block 918). The non-primary initiator node responds to this loss of communication with the primary node by initiating the primary node election process (block 920). A local posting of the LCE can also be attempted followed by the non-primary node initiating the primary node election process. Also, the non-primary node forwards a request to the primary node to issue a caller resynchronization event when the attempt at the local posting fails (block 934).

Figure 10:
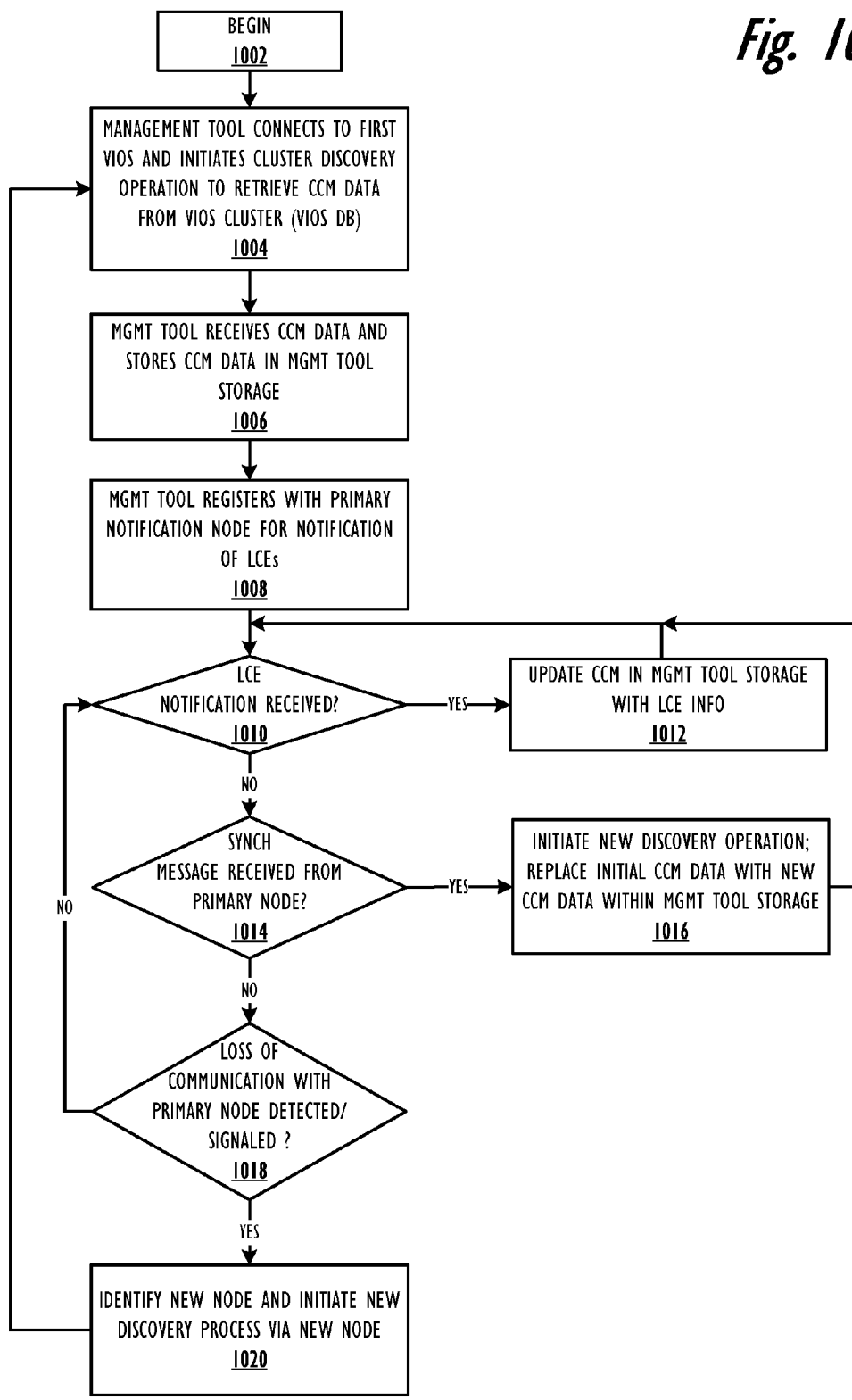
FIG. 10 is a high level flow chart of a method by which a management tool connects to a VIOS cluster and synchronizes its stored cluster configuration data with current cluster configuration via use of a single point of communication, according to one embodiment.

Referring now to FIG. 10, wherein is provided a flow chart of a method by which the management tool 180 connects to a single node of the VIOS cluster to retrieve cluster configuration and management data (CCM) data and subsequently synchronizes the stored CCM data current cluster configuration via automatic updates of detected changes to the cluster, where the updates are provided/received via use of a single point of communication with the cluster. The method begins at block 1002 and proceeds to block 1004 at which the management tool connects to a first VIOS of the VIOS cluster and initiates, via the first VIOS, a discovery operation to discovery initial CCM data (including one or more of an identification (ID) of all nodes existing within the VIOS cluster, information/data related to one or more of a configuration, a topology, and a resource allocation of the VIOS cluster, life cycle events occurring on the VIOS cluster prior to the discovery, etal). As provided herein, connecting a management tool to the first VIOS comprises accessing, via an adapter on a CEC in which the first VIOS is executing, an application programming interface (API) of the first VIOS. Also, initiating a discovery operation comprises forwarding via a command line interface (CLI) to the API a first management command that triggers a daemon of the first VIOS that is in communication with the API to execute the discovery operation by accessing a shared VIOS database (DB) to retrieve the listing of nodes and other CCM data stored at the VIOS DB.

The management tool receives the initial CCM data from the discovery operation and stores the received CMC data within a storage that is locally (or remotely) accessible to the management tool (block 1006). The management tool then registers with a single primary notification node of the VIOS cluster to receive information about life cycle events (LCEs) occurring anywhere within the entire VIOS cluster (block 1008). According to one embodiment, the process of registering with a single primary notification node of the VIOS cluster to receive information about life cycle events (LCEs) occurring anywhere within the entire VIOS cluster comprises: identifying which node within the VIOS cluster is the primary notification node; and registering a transmission control protocol (TCP) socket of the management tool with an application programming interface (API) of the single primary notification node. Once the management tool has registered with the primary node, the management tool automatically updates the stored CCM data based on LCEs occurring within the cluster (block 1012), responsive to the management tool receiving a message with information about a LCE associated with the VIOS cluster (block 1010). Additionally, responsive to receiving a synchronization message from the primary node (block 1014), the management tool: initiates a new discovery operation on the VIOS cluster via the primary node; and replaces the stored CCM data within the management tool accessible storage with current CCM data retrieved by the new discovery operation (block 1016). Also, responsive to detecting a loss of communication with the primary node (block 1018), the management tool identifies a next node of the VIOS cluster; automatically initiates a connection with the next node (block 1020). The management tool then performs a new discovery operation on the VIOS cluster via the next node (block 1004); and registers with a current primary node to receive the LCEs of the VIOS cluster (block 1006). The above method thus enables the management tool to maintain scalable data synchronization of the VIOS cluster.

The flowcharts and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the flow charts above, one or more of the methods are embodied in a computer program product having a computer readable medium containing computer readable/program code/instructions such that a series of steps are performed when the computer readable/program code/instructions are executed (by a processing unit/processor) on a computing device/machine. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R. F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a data processing system having one or more computing electronic complexes (CECs) that comprise a plurality of virtual input/output (I/O) servers (VIOSes) configured within a VIOS cluster having a shared VIOS database (DB), wherein each VIOS provides I/O resources to one or more logical partitions (LPARs) executing within the one or more CECs, a first VIOS of the VIOS cluster executing code on a processing resource to perform a method comprising:
committing the first VIOS as a primary node of the VIOS cluster by performing a primary node commit process comprising:
locking a primary node identifier (ID) field in the shared VIOS DB;
sending a commit signal to the shared VIOS DB;
updating the primary node ID field in the shared VIOS DB with a unique ID that is associated with the first VIOS; and
unlocking the primary node ID field in the VIOS DB;
registering one or more callers to receive notification from the first VIOS of specific events occurring within the cluster, wherein registering the one or more callers further comprises registering a transmission control protocol (TCP) socket of each of the one or more callers with an application programming interface (API) of the first VIOS;
receiving notification of an occurrence of one of the specific events; and
in response to receiving notification of the occurrence of one of the specific events, automatically forwarding information of the specific event to the registered TCP socket of each of the one or more registered callers.

2. The method of claim 1, wherein:
the automatically forwarding information of the specific event further comprises: a daemon of the first VIOS passing a message payload file to the API, wherein the message payload file is retrieved from a message payload file directory within the shared VIOS DB; and
the registered TCP socket of each of the one or more callers is associated with a same type of event occurrence as the one of the specific events.

3. The method of claim 1, wherein the receiving notification of an occurrence of one of the specific events further comprises:
receiving an event notification from a second node of the VIOS cluster;
parsing the event notification for identifying information; and
accessing a message payload file directory within the shared VIOS DB and retrieving a message payload file corresponding to the identifying information parsed from the event notification.

4. The method of claim 1, wherein the committing the first VIOS as a primary node further comprises:
notifying each other node within the VIOS cluster that the first VIOS has committed as the primary node;
in response to determining that the first VIOS no longer meets requirements to be the primary node:
initiating a primary node election; and
withholding the forwarding of information to the registered callers of any received event notification;
in response to determining that the first VIOS is no longer the primary node, forwarding a request to a new primary node to issue a resynchronization command to allow the callers to register with a current primary node;
in response to determining that the first VIOS is not the primary node and the first VIOS meets the requirements to be the primary node;
determining whether the primary node ID field in the shared VIOS DB is locked by another node;
in response to determining the primary node ID field in the shared VIOS DB is locked by another node, setting a primary node election timer to track an elapsed time since the first VIOS last attempted to become the primary node, wherein the timer expires after an amount of time that is based on the number of nodes within the VIOS cluster; and
in response to determining the primary node ID field in the shared VIOS DB is not locked by another node initializing the commit process for the first VIOS; and
in response to detecting election of another node within the VIOS cluster as the primary node, terminating the primary node election timer.

5. The method of claim 1, further comprising:
detecting a node drop alert from within the VIOS cluster;
determining a node that has been dropped from the VIOS cluster;
checking a message payload file directory for a payload entry associated with the dropped node;
in response to finding a message payload file for the dropped node, determining whether the message payload file was completely written before the node dropped;
in response to the message payload file having been completed written before the node dropped, the first VIOS:
reading the message payload file and posting a LCE for each file to the one or more registered callers; and
issuing a caller resynchronization command to the one or more callers registered to receive information about node drop events.

6. The method of claim 1, wherein the one or more registered callers comprise a management tool and the one or more specific events are life cycle events (LCEs), the method further comprising:
in response to receiving a command line interface command from the management tool to execute a discovery operation, facilitating a discovery operation of the management tool by accessing the VIOS DB and discovering each node within the VIOS cluster;
returning to the management tool via the API a listing of each node within the VIOS cluster;
returning to the management tool one or more additional information about one or more of the VIOS cluster and one or more of the nodes within the VIOS cluster; and
registering the management tool for receipt of notification of an occurrence of each LCE occurring on the nodes of the VIOS cluster;
wherein the LCEs track creation and destruction of particular resources within the cluster, including one or more of LCEs from among: adding a node to the cluster, removing a node from the cluster, creating a resource such as a logical unit (LU), and removing a logical unit.

7. A computer program product comprising:
a non-transitory computer-readable storage medium; and
program code on the machine-readable storage device that when executed by a processor of a first virtual input/output server within a VIOS cluster, wherein the VIOS cluster comprises a plurality of VIOSes and a shared VIOS database (DB), causes the first VIOS to perform the functions of:
committing the first VIOS as a primary node of the VIOS cluster by performing a primary node commit process comprising:
locking a primary node identifier (ID) field in the shared VIOS DB;
sending a commit signal to the shared VIOS DB;
updating the primary node ID field in the shared VIOS DB with a unique ID that is associated with the first VIOS; and
unlocking the primary node ID field in the VIOS DB;
registering one or more callers to receive notification from the first VIOS of specific events occurring within the cluster, wherein registering the one or more callers further comprises registering a transmission control protocol (TCP) socket of each of the one or more callers with an application programming interface (API) of the first VIOS;
receiving notification of an occurrence of one of the specific events; and
in response to receiving notification of the occurrence of one of the specific events, automatically forwarding information of the specific event to the registered TCP socket of each of the one or more registered callers.

8. The computer program product of claim 7, wherein:
the program code performing the function of automatically forwarding of information of the specific event further comprises: a daemon of the first VIOS passing a message payload file to the API, wherein the message payload file is retrieved from a message payload file directory within the shared VIOS DB; and
the registered TCP socket of each of the one or more callers is associated with a same type of event occurrence as the one of the specific events.

9. The computer program product of claim 7, wherein program code performing the function of receiving notification of an occurrence of one of the specific events further comprises program code that causes the VIOS to perform the functions of:
receiving an event notification from a second node of the VIOS cluster;
parsing the event notification for identifying information; and
accessing the shared VIOS DB and retrieving a message payload file corresponding to the identifying information parsed from the event notification.

10. The computer program product of claim 7, wherein the program code performing the function of committing the first VIOS as a primary node further comprises program code that causes the first VIOS to performing the functions of:
notifying each other node within the VIOS cluster that the first VIOS has committed as the primary node;
in response to determining that the first VIOS no longer meets requirements to be the primary node:
initiating a primary node election; and
withholding the forwarding of information to the registered callers of any received event notification;
in response to determining that the first VIOS is no longer the primary node, forwarding a request to a new primary node to issue a resynchronization command to allow the callers to register with a current primary node;
in response to determining that the first VIOS is not the primary node and the first VIOS meets the requirements to be the primary node:
determining whether the primary node ID field in the shared VIOS DB is locked by another node;
in response to determining the primary node ID field in the shared VIOS DB is locked by another node, setting a primary node election timer to track an elapsed time since the first VIOS last attempted to become the primary node, wherein the timer expires after an amount of time that is based on the number of nodes within the VIOS cluster; and
in response to determining the primary node ID field in the shared VIOS DB is not locked by another node, initializing the commit process for the first VIOS; and
in response to detecting election of another node within the VIOS cluster as the primary node, terminating the primary node election timer.

11. The computer program product of claim 7, further comprising program code that causes the first VIOS to perform the functions of:
detecting a node drop alert from within the VIOS cluster;
determining a node that has been dropped from the VIOS cluster;
checking a message payload file directory for a payload entry associated with the dropped node;
in response to finding a message payload file for the dropped node, determining whether the message payload file was completely written before the node dropped;
in response to the message payload file having been completed written before the node dropped, reading the message payload file and posting a LCE for each file to the one or more registered callers; and
issuing a caller resynchronization command to the one or more callers registered to receive information about node drop events.

12. The computer program product of claim 7, wherein the one or more registered callers comprise a management tool and the one or more specific events are life cycle events (LCEs), the executable code further performing the functions of:

in response to receiving a command line interface command from the management tool to execute a discovery operation, facilitating a discovery operation of the management tool by accessing the VIOS DB and discovering each node within the VIOS cluster;

returning to the management tool via the API a listing of each node within the VIOS cluster;

returning to the management tool one or more additional information about one or more of the VIOS cluster and one or more of the nodes within the VIOS cluster; and registering the management tool for receipt of notification of an occurrence of each LCE occurring on the nodes of the VIOS cluster;

wherein the LCEs track creation and destruction of particular resources within the cluster, including one or more LCEs from among: adding a node to the cluster, removing a node from the cluster, creating a resource such as a logical unit (LU), and removing a logical unit.

13. A data processing system comprising:

one or more processors providing processing resources;

one or more memories coupled to the one or more processors;

a cluster-aware (CA) operating system (OS) which generates a first virtual input/output server (VIOS) that is communicatively couple to other VIOSes and to a VIOS database (DB) to create a VISO cluster, wherein the CA_OS comprises a utility having program code executing on a processing resource of the first VIOS, which utility causes the first VIOS to:

commit the first VIOS as a primary node of the VIOS cluster by performing a primary node commit process comprising:

lock a primary node identifier (ID) field in the shared VIOS DB;

send a commit signal to the shared VIOS DB;

update the primary node ID field in the shared VIOS DB with a unique ID that is associated with the first VIOS; and unlock the primary node ID field in the VIOS DB;

register one or more callers to receive notification from the first VIOS of specific events occurring within the cluster, wherein registering the one or more callers further comprises the first VIOS registering a transmission control protocol (TCP) socket of each of the one or more callers with an application programming interface (API) of the first VIOS;

receive notification of an occurrence of one of the specific events; and in response to receiving notification of the occurrence of one of the specific events, automatically forward information of the specific event to the registered TCP socket of each of the one or more registered callers.

14. The data processing system of claim 13, wherein:

the first VIOS performing the function of automatically forwarding information of the specific event further comprises: pass, via a daemon of the first VIOS, a message payload file to the API, wherein the message payload file is retrieved from a message payload file directory within the shared VIOS DB; and the registered TCP socket of each of the one or more callers is associated with a same type of event occurrence as the one of the specific events.

15. The data processing system of claim 13, wherein the first VIOS performing the function of receiving notification of an occurrence of one of the specific events further comprises:

receive an event notification from a second node of the VIOS cluster;

parse the event notification for identifying information; and access the shared VIOS DB and retrieving a message payload file corresponding to the identifying information parsed from the event notification.

16. The data processing system of claim 13, wherein the first VIOS performing the function of committing the first VIOS as a primary node further comprises:

notify each other node within the VIOS cluster that the first VIOS has committed as the primary node;

in response to determining that the first VIOS no longer meets the requirements to be the primary node:

initiate a primary node election; and withhold the forwarding of information to the registered callers of any received event notification; and in response to determining that the first VIOS is no longer the primary node, forward a request to a new primary node to issue a resynchronization command to allow the callers to register with a current primary node;

in response to determining that the first VIOS is not the primary node and the first VIOS meets the requirements to be the primary node:

determine whether the primary node ID field in the shared VIOS DB is locked by another node;

in response to determining the primary node ID field in the shared VIOS DB is locked by another node, set a primary node election timer to track an elapsed time since the first VIOS last attempted to become the primary node, wherein the timer expires after an amount of time that is based on the number of nodes within the VIOS cluster; and in response to determining the primary node ID field in the shared VIOS DB is not locked by another node, initialize the commit process for the first VIOS; and in response to detecting election of another node within the VIOS cluster as the primary node, terminate the primary node election timer.

17. The data processing system of claim 13, wherein the utility further comprises program code that when executed causes the first VIOS to:

detect a node drop alert from within the VIOS cluster;

determine a node that has been dropped from the VIOS cluster;

check a message payload file directory for a payload entry associated with the dropped node;

in response to finding a message payload file for the dropped node, determine whether the message payload file was completely written before the node dropped;

in response to the message payload file having been completed written before the node dropped, read the message payload file and posting data about a life cycle event (LCE) from each file to the one or more registered callers; and issue a caller resynchronization command to the one or more callers registered to receive information about node drop events.

18. The data processing system of claim 13, wherein the one or more registered callers comprise a management tool and the one or more specific events are life cycle events (LCEs), the executable code further performing the functions of:

in response to receiving a command line interface command from the management tool to execute a discovery operation, facilitate a discovery operation of the management tool by accessing the VIOS DB and discovering each node within the VIOS cluster;
return to the management tool via the API a listing of each node within the VIOS cluster;
return to the management tool one or more additional information about one or more of the VIOS cluster and one or more of the nodes within the VIOS cluster; and
register the management tool for receipt of notification of an occurrence of each LCE occurring on the nodes of the VIOS cluster;
wherein the LCEs track creation and destruction of particular resources within the cluster, including one or more LCEs from among: adding a node to the cluster; removing a node from the cluster; creating a resource such as a logical unit (LU); and removing a resource.

19. In a data processing system having one or more computing electronic complexes (CECs) that comprise a plurality of virtual input/output (I/O) servers (VIOSes) configured within a VIOS cluster having a shared VIOS database (DB), wherein each VIOS provides I/O resources to one or more logical partitions (LPARs) executing within the one or more CECs, a first VIOS of the VIOS cluster executing code on a processing resource to perform a method comprising:
detecting an occurrence of a life cycle event (LCE) within the cluster, wherein the LCE is an event occurring within or affecting one of a node, a connection, one or more partitions serviced by the first VIOS, or a resource of the cluster that changes the configuration of the cluster and which can affect one or more operations of the node, the specific resource, the one or more partitions, or the cluster as a whole;
generating a message file containing information about the LCE;
forwarding the message file to the shared VIOS DB and storing the message file within a message file directory within the shared VIOS DB; and
forwarding a notification of the LCE to a primary node of the VIOS cluster, wherein in response to receiving the notification of the LCE, the primary node posts the notification of the LCE to a transmission control protocol (TCP) socket of each of one or more registered callers, wherein the TCP socket of each of the one or more callers is registered with an application programming interface (API) of the first VIOS, and wherein the one or more registered callers are registered to receive notifications on the LCE;
wherein the primary node is committed to be the primary node of the VIOS cluster via a primary node commit process in which the primary node: locks a primary node identifier (ID) field in the shared VIOS DB; sends a commit signal to the shared VIOS DB; updates the primary node ID field in the shared VIOS DB with a unique ID that is associated with the first VIOS; and unlocks the primary node ID field in the VIOS DB.

20. The method of claim 19, further comprising:
in response to receipt of an acknowledgement from the primary node of completion of an API request by the primary node involving receipt of the message file from the VIOS DB, initiating a cleanup operation to remove the message file from the shared VIOS DB;
wherein the LCE tracks creation and destruction of particular resources within the cluster, including one or more LCEs from among: adding a node to the cluster; removing a node from the cluster; creating a resource such as a logical unit (LU); and removing a resource.

21. The method of claim 19, wherein the first node is an initiator node, and the method further comprising:
in response to an occurrence of a first type error condition, wherein the initiator node dies after writing the message file to the shared VIOS DB but before being able to notify the primary node of the presence of the message payload file, performing a cleanup of the message payload files on one of a reboot of the initiator node or a re-entrance of the initiator node into the VIOS cluster.

22. The method of claim 19, further comprising: in response to the first node being elected as a primary node, autonomously issuing a caller resynchronization command to the VIOS cluster.

23. The method of claim 19, further comprising:
in response to an occurrence of a second type error condition, wherein a daemon of the initiator node dies, automatically re-spawning the daemon;
in response to a daemon being started or re-spawned within the first VIOS, the daemon initiating a check for any message files within a local message payload directory of the first node;
in response to there being message files within the local message payload directory, checking the message files for status information; and
in response to the status information indicating processing of the message is incomplete:
initiating a reposting of the message file to the shared VIOS DB and notification of the LCE to the primary node; and
forwarding a request to the primary node for the primary node to issue a caller resynchronization command.

24. The method of claim 19, further comprising:
in response to an occurrence of a third type error condition, wherein the first node cannot write to the message payload file directory:
logging an error;
attempting to post the LCE within the local storage repository of the first node; and
in response to not being able to post the LCE within the local storage repository, forwarding a request to the primary node to issue a caller resynchronization command.

25. The method of claim 19, further comprising:
in response to an occurrence of one of: a fourth type error condition, wherein the first VIOS is unable to communicate over the cluster messaging interface; and a fifth type error condition, wherein the first VIOS is unable to communicate with the primary node: logging an error within the local storage and initiating a primary node election process.

26. A computer implemented method for enabling scalable data synchronization of a virtual input/output server (VIOS) cluster, the method comprising:
connecting a management tool to a first VIOS of the VIOS cluster;
initiating, via the first VIOS, a discovery operation to discovery initial cluster configuration and management (CCM) data;
receiving the initial CCM data from the discovery operation;
storing the received CCM data within a storage associated with and accessible to the management tool;
registering with a single primary node of the VIOS cluster to receive information about life cycle events (LCEs) occurring anywhere within the entire VIOS cluster, wherein the LCEs comprise one or more events occurring within or affecting one of a node, a connection, and a resource of the cluster that changes a configuration of the cluster and which can affect one or more operations of the node, a specific resource, one or more partitions supported by the node, and the cluster as a whole, wherein registering with the single primary node of the VIOS cluster to receive information about LCEs further comprises registering a transmission control protocol (TCP) socket of the management tool with an application programming interface (API) of the single primary node; and in response to receiving a message with information about a LCE associated with the VIOS cluster, updating the stored CCM data based on the LCE;

wherein a primary node is committed to be the single primary node of the VIOS cluster via a primary node commit process in which the primary node: locks a primary node identifier (ID) field in a shared VIOS database (DB) of the VIOS cluster; sends a commit signal to the shared VIOS DB; updates the primary node ID field in the shared VIOS DB with a unique ID that is associated with the first VIOS; and unlocks the primary node ID field in the VIOS DB.

27. The method of claim 26, wherein:

connecting a management tool to the first VIOS comprises accessing, via an adapter on a central electronic complex in which the first VIOS is executing, an API of the first VIOS; and initiating a discovery operation comprises forwarding via a command line interface (CLI) to the API a first management command that triggers a daemon of the first VIOS that is in communication with the API to execute the discovery operation by accessing the shared VIOS DB to retrieve the listing of nodes and other CCM data stored at the shared VIOS DB.

28. The method of claim 26, wherein registering with the single primary node of the VIOS cluster to receive information about life cycle events (LCEs) occurring anywhere within the entire VIOS cluster comprises identifying which node within the VIOS cluster is the primary notification node.

29. The method of claim 26, further comprising:

in response to receiving a synchronization message from the single primary node: initiating a new discovery operation on the VIOS cluster via the single primary node; and replacing the stored CCM data within the management tool accessible/associated storage with current CCM data retrieved by the new discovery operation;

wherein the LCE tracks creation and destruction of particular resources within the cluster, including one or more LCEs from among: adding a node to the cluster; removing a node from the cluster; creating a resource such as a logical unit (LU); and removing a resource.

30. The method of claim 26, further comprising:

in response to detecting a loss of communication with the single primary node: identifying a next node of the VIOS cluster; automatically initiating a connection with the next node; performing a new discovery operation on the VIOS cluster via the next node; and registering with a current primary node to receive the LCEs of the VIOS cluster.

* * * * *